United States Patent
Hong

(10) Patent No.: US 12,483,962 B2
(45) Date of Patent: Nov. 25, 2025

(54) ADJUSTMENT INDICATION METHOD AND DEVICE, AND COMMUNICATION LINK ADJUSTMENT METHOD AND DEVICE

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 365 days.

(21) Appl. No.: 18/043,450

(22) PCT Filed: Sep. 2, 2020

(86) PCT No.: PCT/CN2020/113100
§ 371 (c)(1),
(2) Date: Feb. 28, 2023

(87) PCT Pub. No.: WO2022/047678
PCT Pub. Date: Mar. 10, 2022

(65) Prior Publication Data
US 2023/0337101 A1    Oct. 19, 2023

(51) Int. Cl.
*H04W 36/36* (2009.01)
*H04W 36/30* (2009.01)

(52) U.S. Cl.
CPC ......... *H04W 36/36* (2013.01); *H04W 36/305* (2018.08)

(58) Field of Classification Search
CPC ... H04W 36/30; H04W 36/36; H04W 36/302; H04W 36/305; H04W 36/362; H04W 36/385; H04W 40/00

USPC ............................................ 455/436
See application file for complete search history.

(56) References Cited

U.S. PATENT DOCUMENTS

| | | | |
|---|---|---|---|
| 10,299,042 B2* | 5/2019 | Dusse | H04R 5/04 |
| 12,284,606 B2* | 4/2025 | Sabouri-Sichani | H04W 4/60 |
| 2004/0192224 A1* | 9/2004 | Kaneko | H04W 88/06 |
| | | | 455/115.2 |

(Continued)

FOREIGN PATENT DOCUMENTS

| CN | 101577911 A | 11/2009 |
|---|---|---|
| CN | 103596269 A | 2/2014 |

OTHER PUBLICATIONS

Extended European Search Report issued in Application No. 20951925.5 dated Apr. 25, 2024, 13 pages.

(Continued)

*Primary Examiner* — Jean A Gelin
(74) *Attorney, Agent, or Firm* — Finnegan, Henderson, Farabow, Garrett & Dunner, L.L.P.

(57) ABSTRACT

A method for indicating adjustment is performed by a terminal, and includes: in response to a need to perform a second communication operation with a second communication system when performing a first communication operation with a first communication system, determining adjustment information based on capability information of the terminal; and sending the adjustment information to the first communication system, wherein the adjustment information is configured to indicate that the first communication system adjusts a communication link between the terminal and the first communication system based on the adjustment information.

20 Claims, 12 Drawing Sheets in response to a need to perform a second communication operation with a second communication system when performing a first communication operation with a first communication system, determining adjustment information based on capability information of the terminal — S101 sending the adjustment information to the first communication system, wherein the adjustment information is configured to indicate that the first communication system adjusts a communication link between the terminal and the first communication system based on the adjustment information — S102

(56) References Cited

U.S. PATENT DOCUMENTS

| | | | |
|---|---|---|---|
| 2006/0056316 A1* | 3/2006 | Chandra | H04B 7/0689 370/254 |
| 2012/0190362 A1 | 7/2012 | Subbarayudu et al. | |
| 2014/0044097 A1* | 2/2014 | Chen | H04W 36/06 455/436 |
| 2014/0093022 A1* | 4/2014 | Shi | H04L 41/0896 375/358 |
| 2014/0220981 A1 | 8/2014 | Jheng et al. | |
| 2014/0342670 A1* | 11/2014 | Kang | H04L 69/14 455/67.11 |
| 2018/0160422 A1 | 6/2018 | Pathak et al. | |
| 2019/0116510 A1* | 4/2019 | Zhang | H04W 36/305 |
| 2019/0222680 A1* | 7/2019 | Chu | H04L 5/0091 |
| 2019/0320495 A1* | 10/2019 | Kuang | H04W 36/0066 |
| 2020/0137522 A1* | 4/2020 | Gummadi | H04W 64/00 |
| 2021/0126973 A1* | 4/2021 | Wang | G05B 23/0213 |
| 2021/0160685 A1* | 5/2021 | Ke | H04W 8/205 |
| 2021/0368571 A1* | 11/2021 | Huang | H04W 76/15 |
| 2022/0006539 A1* | 1/2022 | Sun | H04B 7/0691 |
| 2022/0094404 A1* | 3/2022 | Yao | H04B 7/0482 |
| 2024/0197942 A1* | 6/2024 | Lovlekar | A61L 2/24 |

OTHER PUBLICATIONS

International Search Report and Written Opinion of International Application No. PCT/CN2020/113100, dated Apr. 23, 2021, 14 pages.

* cited by examiner

ADJUSTMENT INDICATION METHOD AND DEVICE, AND COMMUNICATION LINK ADJUSTMENT METHOD AND DEVICE

CROSS-REFERENCE TO RELATED APPLICATION

This application is the U.S. national phase application of International Application No. PCT/CN2020/113100, filed on Sep. 2, 2020, the entire disclosure of which is incorporated herein by reference.

TECHNICAL FIELD

The disclosure relates to the field of communication technology, in particular to a method for indicating adjustment, a method for adjusting a communication link, an electronic device, and a computer-readable storage medium.

BACKGROUND

When a terminal communicates with a current communication system, if the terminal needs to communication with another communication system, a communication uplink and a communication downlink between the current communication system and the terminal are disconnected, which may lead to a complete interruption of communication between the terminal and the current communication system. If the communication between the terminal and the current communication system is not completed, the terminal needs to restart an access process to access the current communication system after the communication with another communication system is completed, which may affect the efficiency of communication with the current communication system.

SUMMARY

According to a first aspect of the disclosure, a method for indicating adjustment applied to a terminal is provided. The method includes: in response to a need to perform a second communication operation with a second communication system when performing a first communication operation with a first communication system, determining adjustment information based on capability information of the terminal; and sending the adjustment information to the first communication system, in which the adjustment information is configured to indicate that the first communication system adjusts a communication link between the terminal and the first communication system based on the adjustment information.

According to a second aspect of the disclosure, a method for adjusting a communication link, applied to a first communication system is provided. The method includes: receiving adjustment information determined by a terminal based on capability information of the terminal; and adjusting a communication link between the terminal and the first communication system based on the adjustment information.

According to a third aspect of the disclosure, an electronic device is provided. The electronic device includes: a processor; and a memory for storing instructions executable by the processor; in which the processor is configured to implement a method for indicating adjustment. The method includes: in response to a need to perform a second communication operation with a second communication system when performing a first communication operation with a first communication system, determining adjustment information based on capability information of the terminal; and sending the adjustment information to the first communication system, in which the adjustment information is configured to indicate that the first communication system adjusts a communication link between the terminal and the first communication system based on the adjustment information.

BRIEF DESCRIPTION OF THE DRAWINGS

A brief description of drawings used in the embodiments is given below. The drawings in the following descriptions are only example embodiments of the disclosure, and for those skilled in the art, other embodiments can be obtained.

DETAILED DESCRIPTION

Example embodiments of the disclosure are described in detail below in combination with the accompanying drawings. The embodiments described here are only examples of the embodiments of the disclosure and are not all embodiments of the disclosure. Based on the embodiments of the disclosure, other embodiments obtained by those skilled in the art are within the protection scope of the disclosure.

Figure 1:
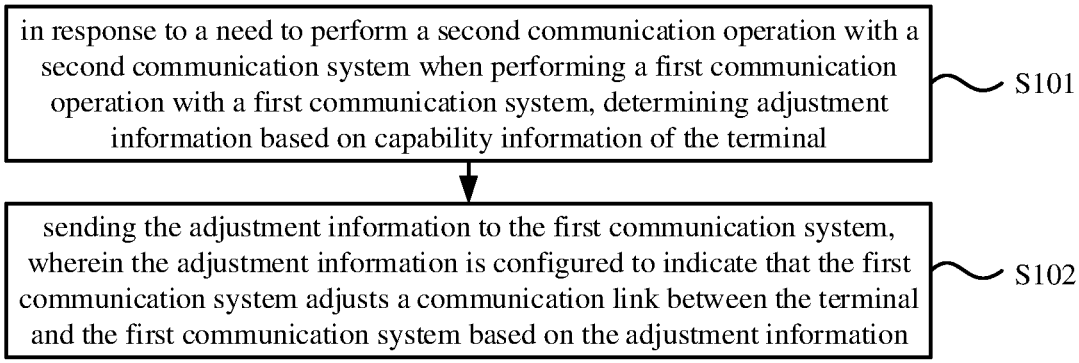
FIG. 1 is a schematic flowchart of a method for indicating adjustment according to an embodiment of the disclosure.

FIG. 1 is a schematic flowchart of a method for indicating adjustment according to an embodiment of the disclosure. The method shown in this embodiment may be applicable to a terminal, which includes, but is not limited to, a cell phone, a tablet computer, a wearable device, a sensor, an Internet of Things (IoT) device, and other electronic devices. The terminal may communicate with a first communication system. The first communication system includes, but is not limited to, a 4G base station, a 5G base station, and a 6G base station. In an embodiment, the first communication system may be a first communication system to which a method for adjusting a communication link described in any of the subsequent embodiments is applied.

As shown in FIG. 1, the method for indicating adjustment includes the following steps.

At step S101, in response to a need to perform a second communication operation with a second communication system when performing a first communication operation with a first communication system, adjustment information is determined based on capability information of the terminal.

At step S102, the adjustment information is sent to the first communication system, in which the adjustment information is configured to indicate that the first communication system adjusts a communication link between the terminal and the first communication system based on the adjustment information.

In an embodiment, if the terminal needs to access the second communication system for performing the second communication operation when the terminal performs the first communication operation with the first communication system, in the related art, the first communication system disconnects a communication uplink and a communication downlink between the first communication system and the terminal, so that the communication between the terminal and the current communication system is completely interrupted. If the terminal does not complete the communication with the first communication system, after the subsequent communication with the second communication system is completed, it is also necessary to restart the access process to access the first communication system. For example, if the first communication system is a first base station, the terminal needs to start a random access process to access the first base station, which seriously affects the communication efficiency between the terminal and the first communication system.

However, different terminals may have different pieces of capability information. Taking hardware capability information as an example, if the terminal is provided with multiple transmitting antennas (e.g., antennas capable of communicating with the first communication system and the second communication system), since the transmitting antennas can perform uplink communication, the terminal has the capability to continue the uplink communication with the first communication system via a first transmitting antenna in the multiple transmitting antennas and perform the uplink communication with the second communication system via a second transmitting antenna in the multiple transmitting antennas, without having to disconnect the uplink communication link between the terminal and the first communication system.

Accordingly, this embodiment may determine the adjustment information based on the capability information of the terminal, and send the adjustment information to the first communication system, for indicating the first communication system to adjust the communication link between the terminal and the first communication system based on the adjustment information, such that the first communication system may maintain one or more communication links between the terminal and the first communication system based on the capability information of the terminal, instead of disconnecting all communication links between the terminal and the first communication system.

For example, in a situation where the capability information indicates that the terminal has a plurality of transmitting antennas, the adjustment information determined may indicate not to suspend a communication uplink between the terminal and the first communication system. After receiving the adjustment information, the first communication system may not suspend the communication uplink between the terminal and the first communication system, i.e., the terminal continues to maintain the uplink communication between the terminal and the first communication system while the terminal performs the communication operation with the second communication system, which ensures the communication efficiency between the terminal and the first communication system.

The first communication system may determine whether to suspend the communication downlink between the terminal and the first communication system based on other information. For example, it may be determined based on whether the second communication operation performed by the terminal with the second communication system includes a downlink communication operation, and a number of receiving antennas for downlink communication provided in the terminal.

It should be noted that although the adjustment information sent by the terminal to the first communication system can indicate how the first communication system adjusts the communication link, the first communication system can adjust the communication link with reference to the adjustment information, but does not adjust the communication link entirely based on the adjustment information. How to adjust the communication link is mainly up to the first communication system itself, for example, the first communication system may adjust the communication link based on the adjustment information and other information.

In an embodiment, the first communication system and the second communication system may refer to different base stations in different operator networks, different or identical base stations in the same operator network, or base stations in a licensed licensed frequency band and access points in an unlicensed frequency band.

In an embodiment, a plurality of Subscriber Identity Module (SIM) cards may be provided in the terminal, such as at least a first SIM card and a second SIM card. The first SIM card and the second SIM card may access the same operator network or different operator networks. The situation that there is a need to perform the second communication operation with the second communication system while performing the first communication operation with the first communication system, may be a situation that, the second SIM card receives a paging message sent by a second base station when the first SIM card communicates with the first base station, and determines there is a need to respond to the paging message via the second SIM card. The second communication operation may be an operation of responding to the paging message or may be an uplink communication operation and/or a downlink communication operation with the second base station required after responding to the paging message.

Optionally, the capability information of the terminal includes hardware capability information and/or software capability information.

Optionally, the hardware capability information includes at least one of:
a first number of transmitting antennas in the terminal, or
a second number of receiving antennas in the terminal.

In an embodiment, the capability information of the terminal may include hardware capability information, and may also include software capability information. The hardware capability information may be the first number of transmitting antennas in the terminal, the second number of receiving antennas in the terminal, or other hardware capability information, such as frequency bands supported by each transmitting antenna and each receiving antenna. The software capability information may be whether the terminal is capable of handling multiple downlink communication operations simultaneously and whether the terminal is capable of handling multiple uplink communication operations simultaneously.

In some embodiments, the terminal can determine the adjustment information based on not only the capability information but also the second communication operation, i.e., based on both the capability information of the terminal and the second communication operation.

The following mainly and exemplarily describes two cases on how to determine the adjustment information in combination with the case that the second communication operation includes an uplink communication operation and a downlink communication operation, one case is that the first number of transmitting antennas is greater than 1 and the second number of receiving antennas is equal to 1, and the other case is that the first number of transmitting antennas is equal to 1 and the number of receiving antennas is greater than 1.

Figure 2:
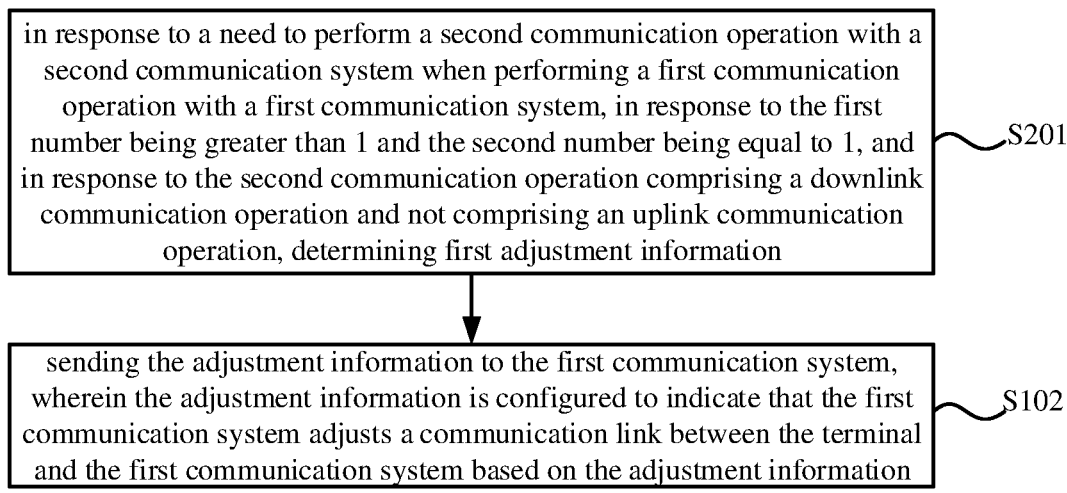
FIG. 2 is a schematic flowchart of another method for indicating adjustment according to an embodiment of the disclosure.

FIG. 2 is a schematic flowchart of another method for indicating adjustment according to an embodiment of the disclosure. As shown in FIG. 2, the hardware capability information of the terminal includes the first number and the second number, and determining the adjustment information based on the capability information of the terminal includes the following step.

At step S201, in response to the first number being greater than 1 and the second number being equal to 1, and in response to the second communication operation including a downlink communication operation and not including an uplink communication operation, first adjustment information is determined.

The first adjustment information is configured to indicate the first communication system to suspend a communication downlink between the terminal and the first communication system, and/or not to suspend a communication uplink between the terminal and the first communication system.

In an embodiment, if the first number is greater than 1 and the second number is equal to 1, the terminal has multiple transmitting antennas but only 1 receiving antenna, in which case the terminal has the ability to perform uplink communication operations with multiple communication systems simultaneously but can only perform a downlink communication operation with one communication system.

Based on the above situation, if it is further determined that the second communication operation includes a downlink communication operation and does not include an uplink communication operation in the above situation, the first adjustment information determined may be suspending the communication downlink between the terminal and the first communication system, and not suspending the communication uplink between the terminal and the first communication system.

After receiving the first adjustment information, the first communication system may suspend the communication downlink between the terminal and the first communication system, and may not suspend the communication uplink between the terminal and the first communication system. The terminal can perform the second communication operation with the second communication system via the receiving antenna, and continue to perform the uplink communication operation with the first communication system via one transmitting antenna. On the basis, it is ensured that the terminal can perform the second communication operation with the second communication system smoothly without disconnecting all communication links between the terminal and the first communication system, so that the terminal can still maintain the uplink communication with the first communication system, which is conducive to ensuring the communication efficiency between the terminal and the first communication system.

Figure 3:
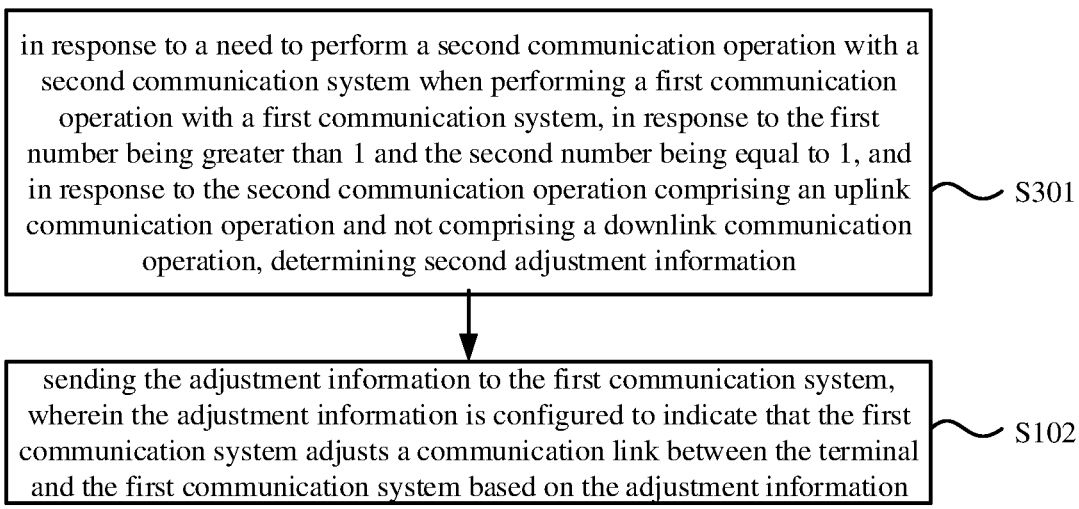
FIG. 3 is a schematic flowchart of yet another method for indicating adjustment according to an embodiment of the disclosure.

FIG. 3 is a schematic flowchart of yet another method for indicating adjustment according to an embodiment of the disclosure. As shown in FIG. 3, the hardware capability information of the terminal includes the first number and the second number, and determining the adjustment information based on the capability information of the terminal includes the following step.

At step S301, in response to the first number being greater than 1 and the second number being equal to 1, and in response to the second communication operation including an uplink communication operation and not including a downlink communication operation, second adjustment information is determined.

The second adjustment information is configured to indicate the first communication system not to suspend a communication downlink between the terminal and the first communication system.

In an embodiment, if the first number is greater than 1 and the second number is equal to 1, and the terminal has multiple transmitting antennas but only 1 receiving antenna, in which case the terminal has the ability to perform uplink communication operations with multiple communication systems simultaneously but can only perform a downlink communication operation with one communication system.

Based on the above situation If it is further determined that the second communication operation includes an uplink communication operation and does not include a downlink communication operation, the second adjustment information determined may be not suspending the communication downlink between the terminal and the first communication system.

After receiving the second adjustment information, the first communication system may not suspend the communication downlink between the terminal and the first communication system, and it is unnecessary to disconnect all communication links between the first communication system and the terminal while ensuring that the terminal can perform the second communication operation with the second communication system smoothly, so that the terminal can still maintain downlink communication with the first communication system, which is conducive to ensuring the communication efficiency between the terminal and the first communication system.

Optionally, the second adjustment information is further configured to indicate the first communication system not to suspend the communication uplink between the terminal and the first communication system, or to indicate the first communication system to suspend the communication uplink between the terminal and the first communication system.

In an embodiment, if the first number is greater than 1 and the second number is equal to 1, and if the second communication operation includes an uplink communication operation and does not include a downlink communication operation, the determined second adjustment information may indicate the first communication system not to suspend the communication uplink between the terminal and the first communication system or may indicate the first communication system to suspend the communication uplink between the terminal and the first communication system, which can be arranged as desired.

In an embodiment, the first communication system may determine whether to suspend the communication uplink between the terminal and the first communication system based on other information. For example, the first communication system may determine whether to suspend the communication uplink between the terminal and the first communication system based on whether the first communication operation includes an uplink communication operation. If the first communication operation includes the uplink communication operation, the communication uplink between the terminal and the first communication system is not suspended, and if the first communication operation does not include the uplink communication operation, the communication uplink between the terminal and the first communication system is suspended.

Figure 4:
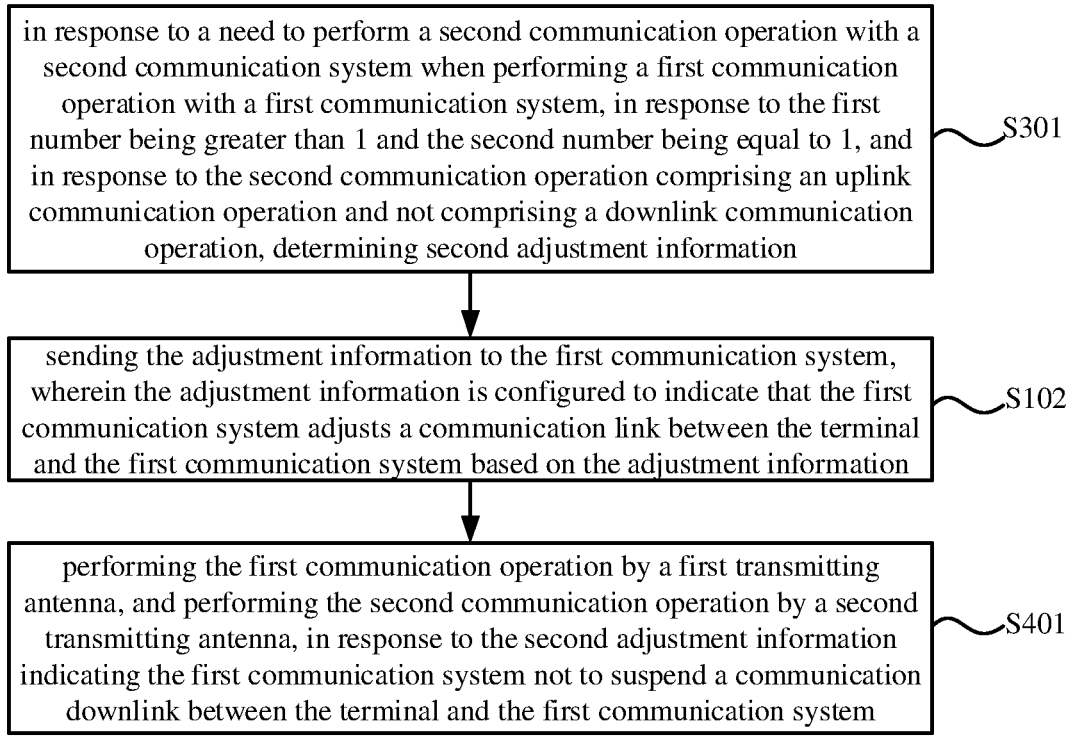
FIG. 4 is a schematic flowchart of yet another method for indicating adjustment according to an embodiment of the disclosure.

FIG. 4 is a schematic flowchart of yet another method for indicating adjustment according to an embodiment of the disclosure. As shown in FIG. 4, the second adjustment information is further configured to indicate the first communication system not to suspend the communication uplink between the terminal and the first communication system, and the method further includes the following step.

At step S401, the first communication operation is performed by a first transmitting antenna, and the second communication operation is performed by a second transmitting antenna.

In an embodiment, if the first number is greater than 1 and the second number is equal to 1, if the second communication operation includes an uplink communication operation and does not include a downlink communication operation, and if the second adjustment information is also configured to indicate the first communication system not to suspend the communication uplink between the terminal and the first communication system, the terminal may continue to perform the first communication operation with the first communication system. In detail, the first communication operation can be performed via the first transmitting antenna in the plurality of transmitting antennas and the second communication operation can be performed via the second transmitting antenna in the plurality of transmitting antennas.

Accordingly, while ensuring that the terminal can smoothly perform the second communication operation with the second communication system, the terminal can still maintain the uplink communication and downlink communication with the first communication system, which is conducive to ensuring the communication efficiency between the terminal and the first communication system.

Figure 5:
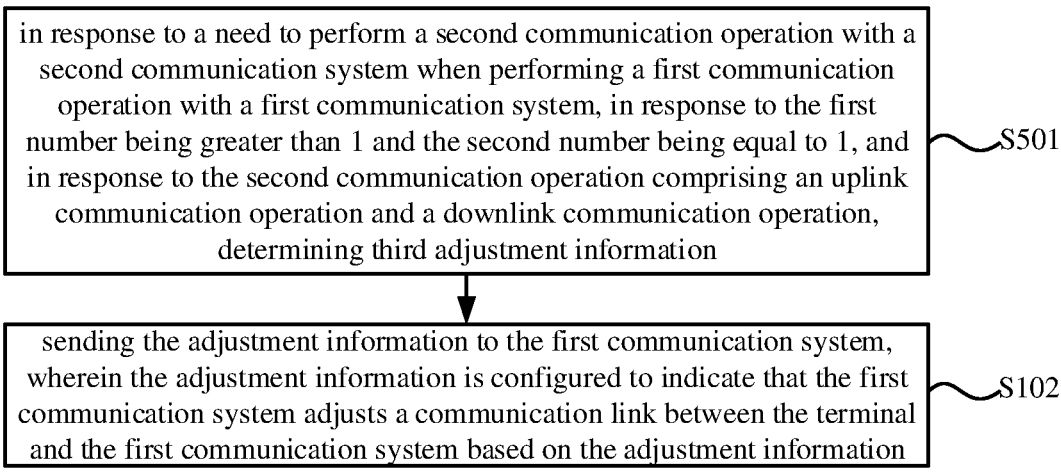
FIG. 5 is a schematic flowchart of yet another method for indicating adjustment according to an embodiment of the disclosure.

FIG. 5 is a schematic flowchart of yet another method for indicating adjustment according to an embodiment of the disclosure. As shown in FIG. 5, the hardware capability information of the terminal includes the first number and the second number, and determining the adjustment information based on the capability information of the terminal includes the following steps.

At step S501, in response to the first number being greater than 1 and the second number being equal to 1, and in response to the second communication operation including an uplink communication operation and a downlink communication operation, third adjustment information is determined.

The third adjustment information is configured to indicate the first communication system to suspend a communication downlink between the terminal and the first communication system.

In an embodiment, if the first number is greater than 1 and the second number is equal to 1, the terminal has multiple transmitting antennas but only 1 receiving antenna, in which case the terminal has the ability to perform uplink communication operations with multiple communication systems simultaneously but can only perform a downlink communication operation with one communication system.

Based on the above situation, it is further determined that the second communication operation includes a downlink communication operation and an uplink communication operation, the third adjustment information determined may be suspending the communication downlink between the terminal and the first communication system.

After receiving the third adjustment information, the first communication system may suspend the communication downlink between the terminal and the first communication system, thus ensuring that the terminal can smoothly perform the second communication operation with the second communication system.

Optionally, the third adjustment information is further configured to indicate the first communication system not to suspend a communication uplink between the terminal and the first communication system, or to indicate the first communication system to suspend the communication uplink between the terminal and the first communication system.

In an embodiment, if the first number is greater than 1 and the second number is equal to 1, and the second communication operation includes an uplink communication operation and a downlink communication operation, the determined third adjustment information may indicate the first communication system not to suspend the communication uplink between the terminal and the first communication system, or may indicate the first communication system to suspend the communication uplink between the terminal and the first communication system, which can be arranged as desired.

In an embodiment, the first communication system may determine whether to suspend the communication uplink between the terminal and the first communication system based on other information. For example, the first communication system may determine whether to suspend the communication uplink between the terminal and the first communication system based on whether the first communication operation includes an uplink communication operation. If the first communication operation includes the uplink communication operation, the communication uplink between the terminal and the first communication system is not suspended, and if the first communication operation does not include the uplink communication operation, the communication uplink between the terminal and the first communication system is suspended.

Figure 6:
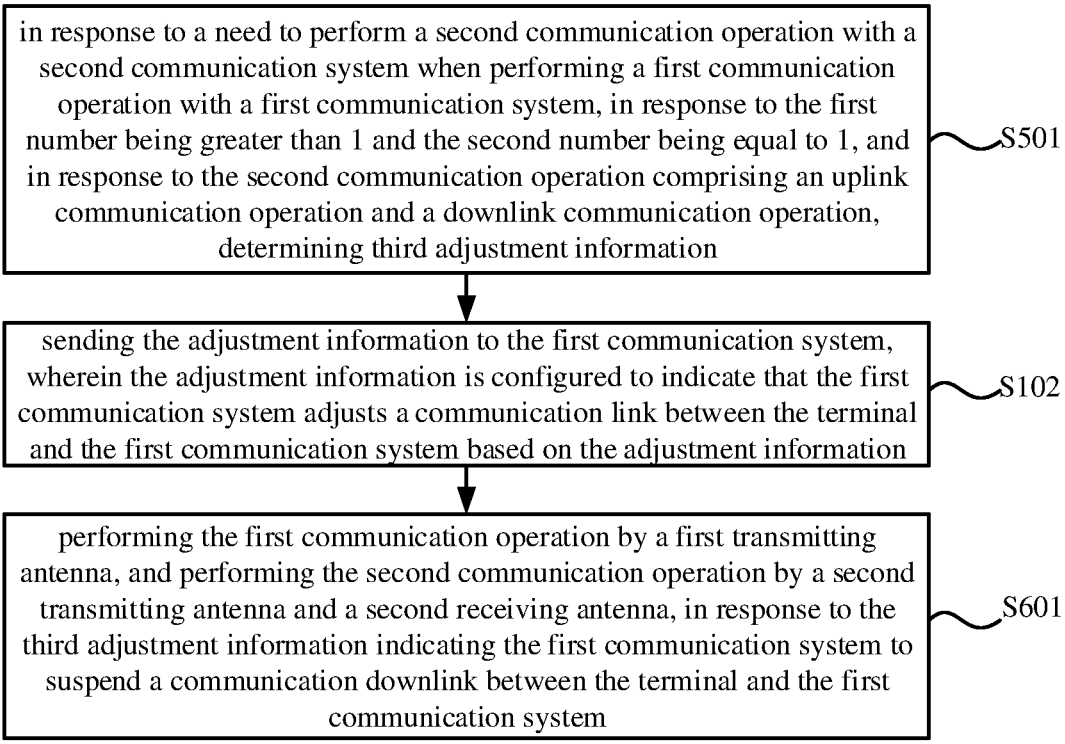
FIG. 6 is a schematic flowchart of yet another method for indicating adjustment according to an embodiment of the disclosure.

FIG. 6 is a schematic flowchart of yet another method for indicating adjustment according to an embodiment of the disclosure. As shown in FIG. 6, the third adjustment information is further configured to indicate the first communication system not to suspend a communication uplink between the terminal and the first communication system, and the method further includes the following steps.

At step S601, the first communication operation is performed by a first transmitting antenna, and the second communication operation is performed by a second transmitting antenna and a second receiving antenna.

In an embodiment, if the first number is greater than 1 and the second number is equal to 1, if the second communication operation includes an uplink communication operation and a downlink communication operation, and if the third adjustment information is also configured to indicate the first communication system not to suspend the communication uplink between the terminal and the first communication system, the terminal may continue to perform the first communication operation with the first communication system. In detail, the first communication operation can be performed via the first transmitting antenna in the plurality of transmitting antennas, and the second communication operation can be performed via the second transmitting antenna in the plurality of transmitting antennas and the second receiving antenna in the plurality of receiving antennas.

Accordingly, while ensuring that the terminal can smoothly perform the second communication operation with the second communication system, the terminal can still maintain uplink communication with the first communication system, which is conducive to ensuring the communication efficiency between the terminal and the first communication system.

Figure 7:
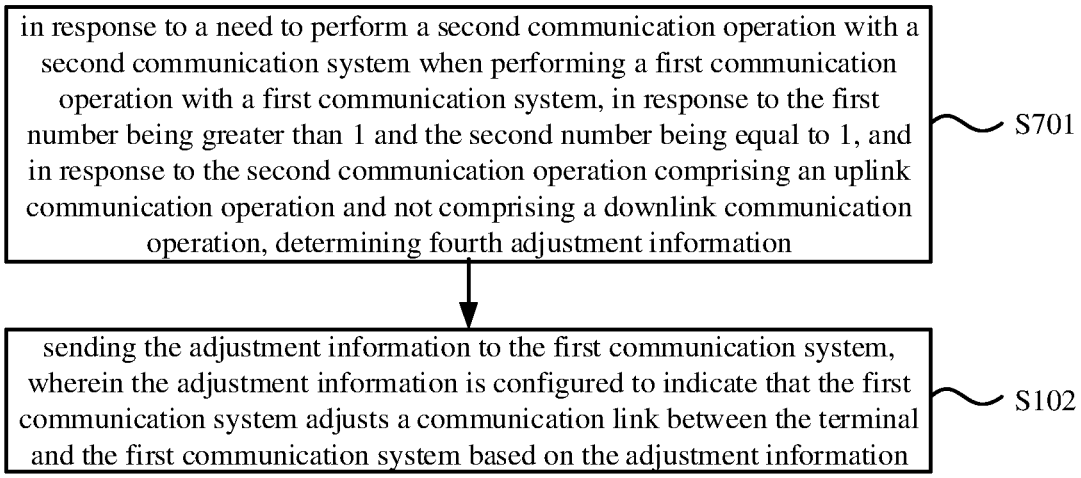
FIG. 7 is a schematic flowchart of yet another method for indicating adjustment according to an embodiment of the disclosure.

FIG. 7 is a schematic flowchart of yet another method for indicating adjustment according to an embodiment of the disclosure. As shown in FIG. 7, the hardware capability information of the terminal includes the first number and the second number, and determining the adjustment information based on the capability information of the terminal includes the following steps.

At step S701, in response to the first number being greater than 1 and the second number being equal to 1, and in response to the second communication operation including an uplink communication operation and not including a downlink communication operation, fourth adjustment information is determined.

The fourth adjustment information is configured to indicate the first communication system to suspend a communication uplink between the terminal and the first communication system, and/or not to suspend a communication downlink between the terminal and the first communication system.

In an embodiment, if the first number is equal to 1 and the second number is greater than 1, and the terminal has multiple receiving antennas but only 1 transmitting antenna, in which case the terminal has the ability to perform downlink communication operations with multiple communication systems simultaneously, but can only perform an uplink communication operation with one communication system.

Based on the above situation, it is further determined that the second communication operation includes an uplink communication operation and does not include a downlink communication operation, the determined fourth adjustment information may be suspending the communication uplink between the terminal and the first communication system and not suspending the communication downlink between the terminal and the first communication system.

After receiving the fourth adjustment information, the first communication system may suspend the communication uplink between the terminal and the first communication system, and does not suspend the communication downlink between the terminal and the first communication system. The terminal can perform the second communication operation with the second communication system via a transmitting antenna and can perform a downlink communication operation with the first communication system via a receiving antenna. Therefore, it is unnecessary to disconnect all communication links between the terminal and the first communication system while ensuring that the terminal can perform the second communication operation with the second communication system smoothly, so that the terminal can still maintain downlink communication with the first communication system, which is conducive to ensuring the communication efficiency between the terminal and the first communication system.

Figure 8:
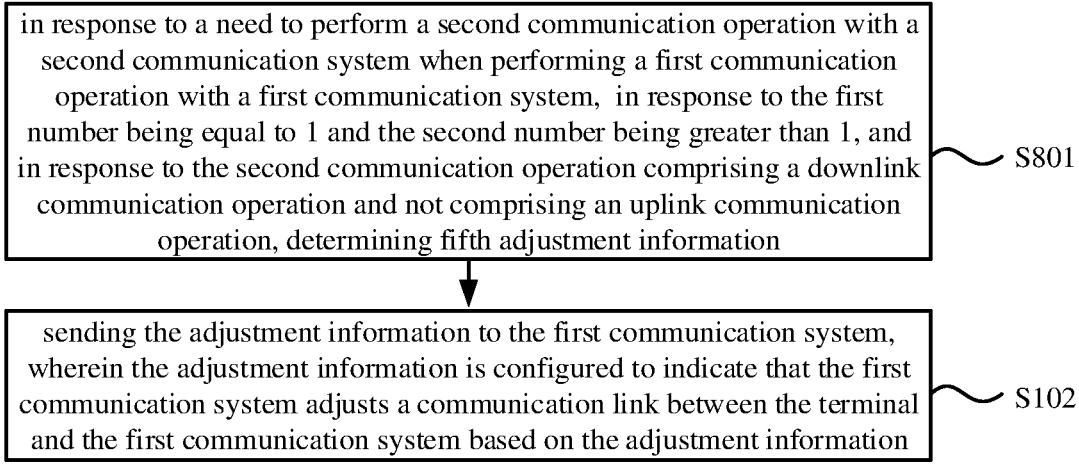
FIG. 8 is a schematic flowchart of yet another method for indicating adjustment according to an embodiment of the disclosure.

FIG. 8 is a schematic flowchart of yet another method for indicating adjustment according to an embodiment of the disclosure. As shown in FIG. 8, the hardware capability information of the terminal includes the first number and the second number, and determining the adjustment information based on the capability information of the terminal includes the following steps.

At step S801, in response to the first number being equal to 1 and the second number being greater than 1, and in response to the second communication operation including a downlink communication operation and not including an uplink communication operation, fifth adjustment information is determined.

The fifth adjustment information is configured to indicate the first communication system not to suspend a communication uplink between the terminal and the first communication system.

In an embodiment, if the first number is equal to 1 and the second number is greater than 1, and the terminal has multiple receiving antennas but only 1 transmitting antenna, in which case the terminal has the ability to perform downlink communication operations with multiple communication systems simultaneously, but can only perform an uplink communication operation with one communication system.

Based on the above situation, it is further determined that the second communication operation includes a downlink communication operation and does not include an uplink communication operation, the determined fifth adjustment information may be not suspending the communication uplink between the terminal and the first communication system.

After receiving the fifth adjustment information, the first communication system may not suspend the communication uplink between the terminal and the first communication system. Therefore, it is unnecessary to disconnect all communication links between the terminal and the first communication system while ensuring that the terminal can perform the second communication operation with the second communication system smoothly, so that the terminal can still maintain uplink communication with the first communication system, which is conducive to ensuring the communication efficiency between the terminal and the first communication system.

Optionally, the fifth adjustment information is further configured to indicate the first communication system not to suspend a communication downlink between the terminal and the first communication system, or to indicate the first communication system to suspend the communication downlink between the terminal and the first communication system.

In an embodiment, if the first number is equal to 1 and the second number is greater than 1, and if the second communication operation includes a downlink communication operation and does not include an uplink communication operation, the determined fifth adjustment information may indicate the first communication system not to suspend the communication downlink between the terminal and the first communication system, or indicate the first communication system to suspend the communication downlink between the terminal and the first communication system, which can be arranged as desired.

In an embodiment, the first communication system may determine whether to suspend the communication downlink between the terminal and the first communication system based on other information. For example, the first communication system may determine whether to suspend the communication downlink between the terminal and the first communication system based on whether the first communication operation includes a downlink communication operation. If the first communication operation includes the downlink communication operation, the communication downlink between the terminal and the first communication system is not suspended, and if the first communication operation does not include the downlink communication operation, the communication downlink between the terminal and the first communication system is suspend.

Figure 9:
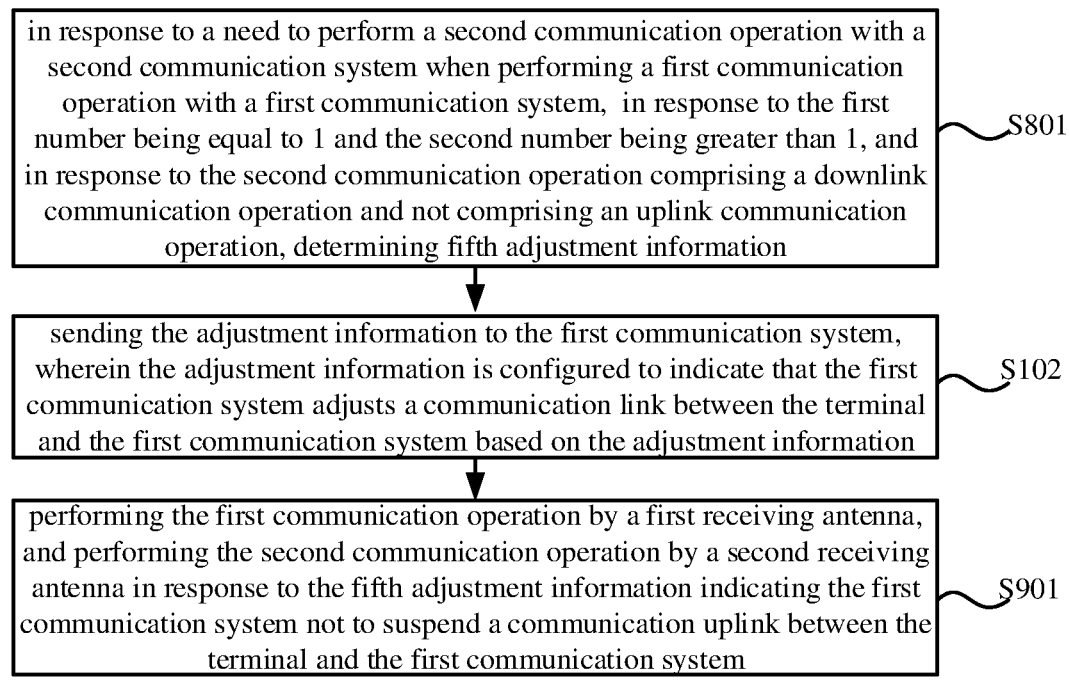
FIG. 9 is a schematic flowchart of yet another method for indicating adjustment according to an embodiment of the disclosure.

FIG. 9 is a schematic flowchart of yet another method for indicating adjustment according to an embodiment of the disclosure. As shown in FIG. 9, the fifth adjustment information is further configured to indicate the first communication system not to suspend a communication downlink between the terminal and the first communication system, and the method further includes the following steps.

At step S901, the first communication operation is performed by a first receiving antenna, and the second communication operation is performed by a second receiving antenna.

In an embodiment, in a case that the first number is equal to 1 and the second number is greater than 1, the second communication operation includes a downlink communication operation and does not include an uplink communication operation, and the fifth adjustment information is also configured to indicate the first communication system not to suspend the communication downlink between the terminal and the first communication system, then the terminal may continue to perform the first communication operation with the first communication system. In detail, the first communication operation is performed via the first receiving antenna in the plurality of receiving antennas and the second communication operation is performed via the second receiving antenna in the plurality of receiving antennas.

Accordingly, while ensuring that the terminal can smoothly perform the second communication operation with the second communication system, the terminal can still maintain the uplink communication and downlink communication with the first communication system, which is conducive to ensuring the communication efficiency between the terminal and the first communication system.

Figure 10:
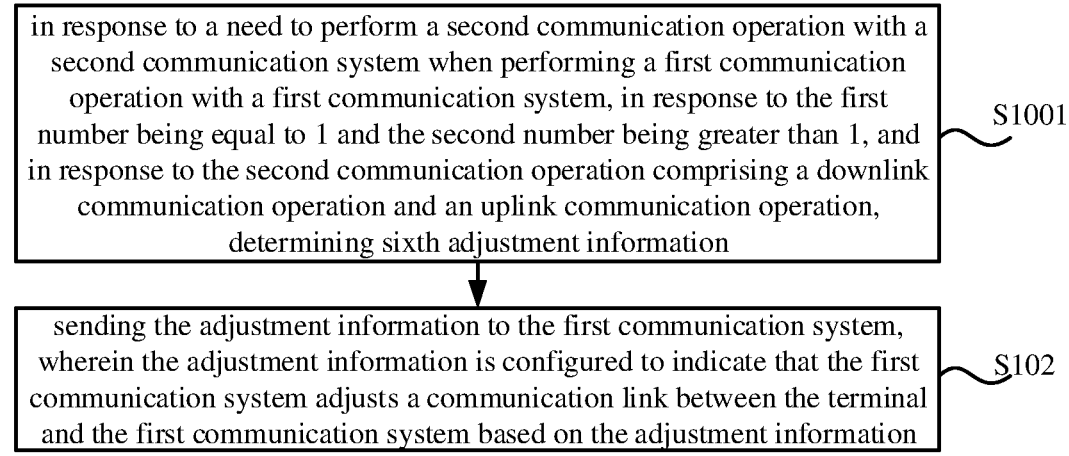
FIG. 10 is a schematic flowchart of yet another method for indicating adjustment according to an embodiment of the disclosure.

FIG. 10 is a schematic flowchart of yet another method for indicating adjustment according to an embodiment of the disclosure. As shown in FIG. 10, the hardware capability information of the terminal includes the first number and the second number, and determining the adjustment information based on the capability information of the terminal includes the following steps.

At step S1001, in response to the first number being equal to 1 and the second number being greater than 1, and in response to the second communication operation including a downlink communication operation and an uplink communication operation, sixth adjustment information is determined.

The sixth adjustment information is configured to indicate the first communication system to suspend a communication uplink between the terminal and the first communication system.

In an embodiment, if the first number is equal to 1 and the second number is greater than 1, the terminal has multiple receiving antennas but only 1 transmitting antenna, in which case the terminal has the ability to perform downlink communication operations with multiple communication systems simultaneously, but can only perform an uplink communication operation with one communication system.

Based on the above situation, it is further determined that the second communication operation includes a downlink communication operation and an uplink communication operation, the sixth adjustment information determined may be suspending the communication uplink between the terminal and the first communication system.

After receiving the sixth adjustment information, the first communication system may suspend the communication uplink between the terminal and the first communication system, thus ensuring that the terminal can smoothly perform the second communication operation with the second communication system.

Optionally, the sixth adjustment information is further configured to indicate the first communication system not to suspend the communication downlink between the terminal and the first communication system, or indicate the first communication system to suspend the communication downlink between the terminal and the first communication system.

In an embodiment, if the first number is equal to 1 and the second number is greater than 1, and the second communication operation includes an uplink communication operation and a downlink communication operation, the determined sixth adjustment information may indicate the first communication system not to suspend the communication downlink between the terminal and the first communication system or may indicate the first communication system to suspend the communication downlink between the terminal and the first communication system, which can be arranged as desired.

In an embodiment, the first communication system may determine whether to suspend the communication downlink between the terminal and the first communication system based on other information. For example, whether to suspend the communication downlink between the terminal and the first communication system is determined based on whether the first communication operation includes a downlink communication operation. If the first communication operation includes the downlink communication operation, the communication downlink between the terminal and the first communication system is not suspended, and if the first communication operation does not include a downlink communication operation, the communication downlink between the terminal and the first communication system is suspended.

Figure 11:
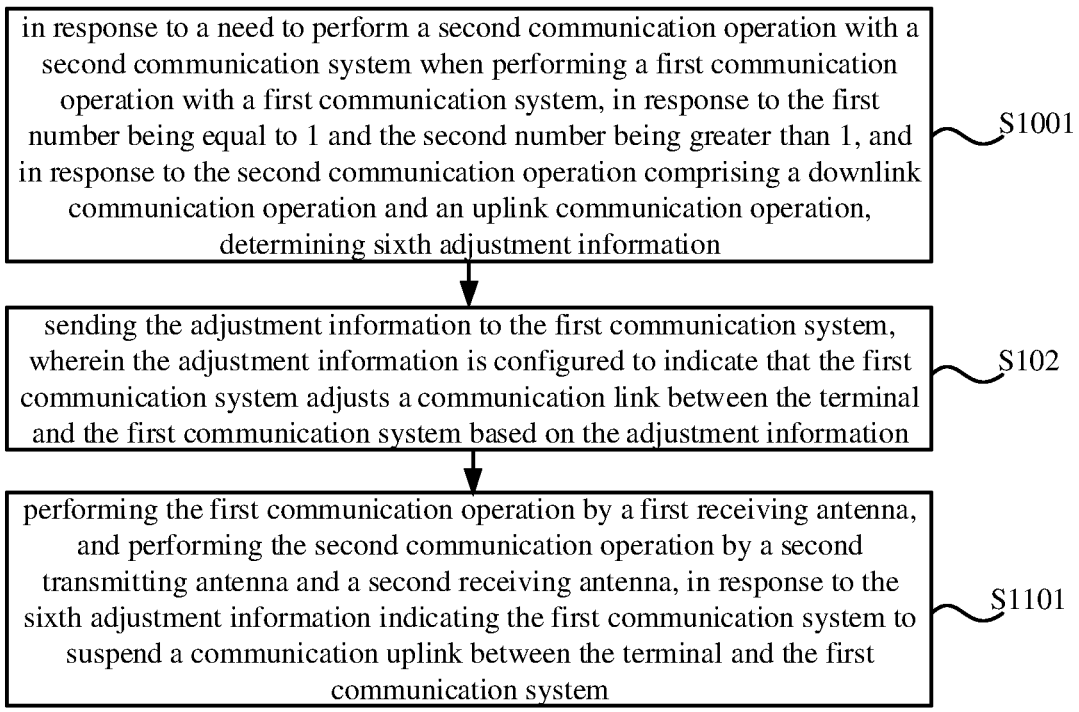
FIG. 11 is a schematic flowchart of yet another method for indicating adjustment according to an embodiment of the disclosure.

FIG. 11 is a schematic flowchart of yet another method for indicating adjustment according to an embodiment of the disclosure. As shown in FIG. 11, the sixth adjustment information is configured to indicate the first communication system not to suspend a communication uplink between the terminal and the first communication system, the method further includes the following steps.

At step S1101, the first communication operation is performed by a first receiving antenna, and the second communication operation is performed by a second transmitting antenna and a second receiving antenna.

In an embodiment, in a case that the first number is equal to 1, the second number is greater than 1, the second communication operation includes a downlink communication operation and an uplink communication operation, and the first adjustment information indicates that the first communication system does not suspend the communication downlink between the terminal and the first communication system, then the terminal may continue to perform the first communication operation with the first communication system. In detail, the first communication operation is performed via the first receiving antenna in the plurality of transmitting antennas, and the second communication operation is performed via the second transmitting antenna in the plurality of transmitting antennas and the second receiving antenna in the plurality of receiving antennas.

Accordingly, while ensuring that the terminal can perform the second communication operation with the second communication system smoothly, the terminal can still maintain downlink communication with the first communication system, which is conducive to ensuring the communication efficiency between the terminal and the first communication system.

Figure 12:
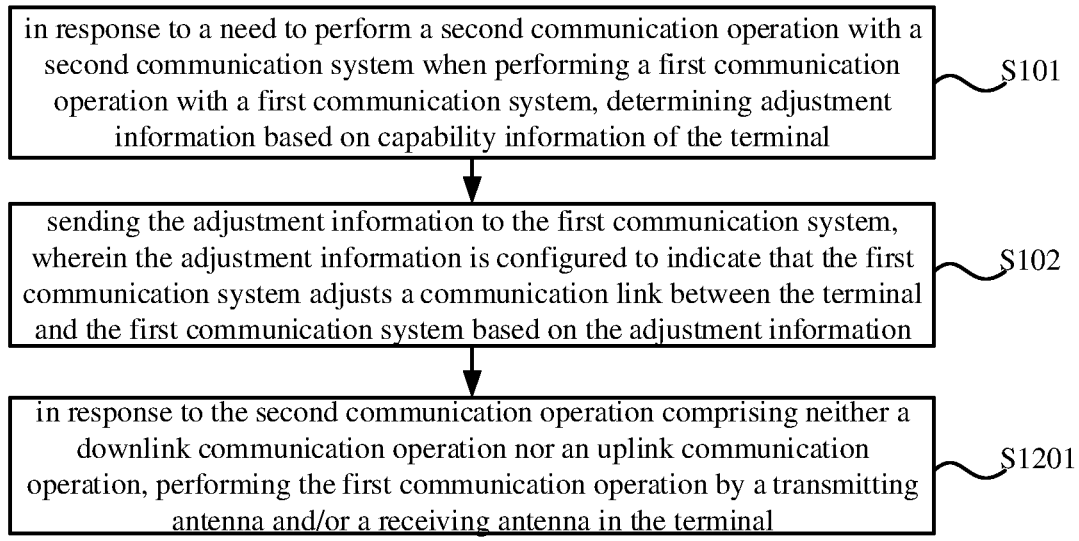
FIG. 12 is a schematic flowchart of yet another method for indicating adjustment according to an embodiment of the disclosure.

FIG. 12 is a schematic flowchart of yet another method for indicating adjustment according to an embodiment of the disclosure. As shown in FIG. 12, the method further includes the following steps.

At step S1201, in response to the second communication operation including neither a downlink communication operation nor an uplink communication operation, the first communication operation is performed by a transmitting antenna and/or a receiving antenna in the terminal.

In an embodiment, if the second communication operation does not include either a downlink communication operation or an uplink communication operation, for example, the second communication operation only enters an inactive state in the second communication system and does not send uplink information or receive downlink information, and then it is possible to continue the first communication operation with the first communication system via the transmitting antenna and receiving antenna of the terminal.

Figure 13:
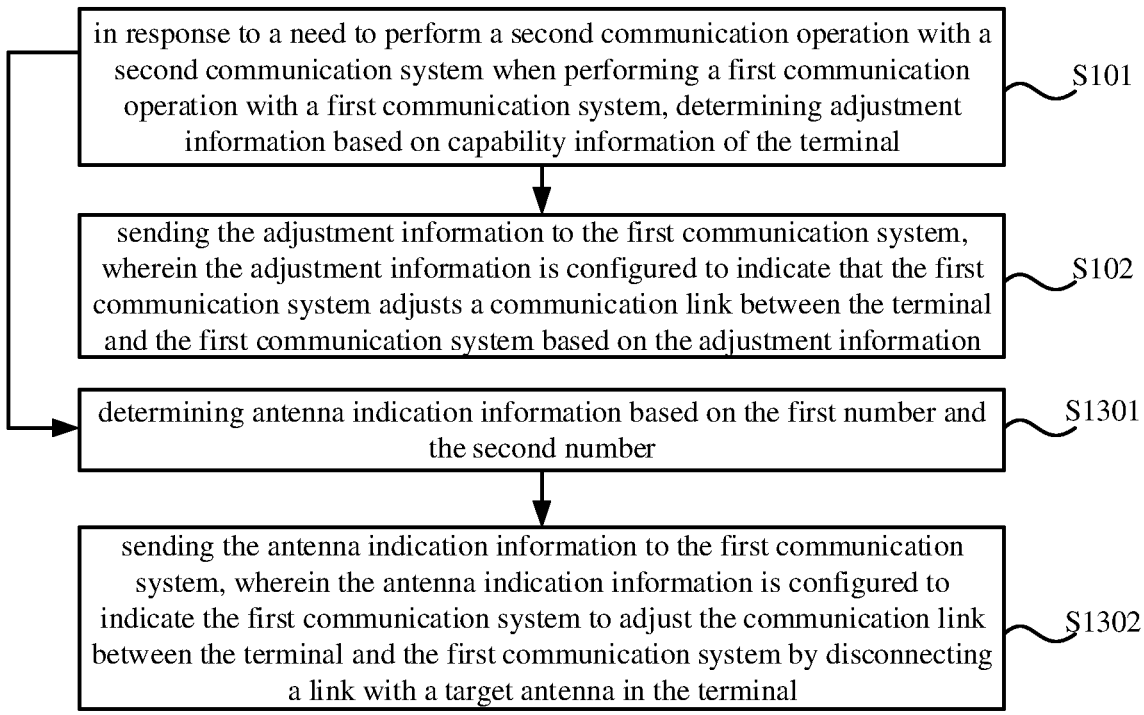
FIG. 13 is a schematic flowchart of yet another method for indicating adjustment according to an embodiment of the disclosure.

FIG. 13 is a schematic flowchart of yet another method for indicating adjustment according to an embodiment of the disclosure. As shown in FIG. 13, the hardware capability information of the terminal includes the first number and the second number, and the method further includes the following steps.

At step S1301, antenna indication information is determined based on the first number and the second number.

At step S1302, the antenna indication information is sent to the first communication system, in which the antenna indication information is configured to indicate the first communication system to adjust the communication link between the terminal and the first communication system by disconnecting a link with a target antenna in the terminal.

In an embodiment, the terminal may determine the antenna indication information based on the first number of transmitting antennas and the second number of receiving antennas. The antenna indication information may include identifiers of the antennas. For example, if the first number is greater than 1 and the second number is equal to 1, the antenna indication information may include an identifier of a target transmitting antenna that is communicating with the first communication system in the transmitting antennas. After receiving the antenna indication information, the first communication system may determine that the target transmitting antenna is a transmitting antenna being used currently based on the identifier of the target transmitting antenna, and may then suspend a communication uplink with the target transmitting antenna, so that the terminal may use the target transmitting antenna for uplink communication with the second communication system.

Figure 14:
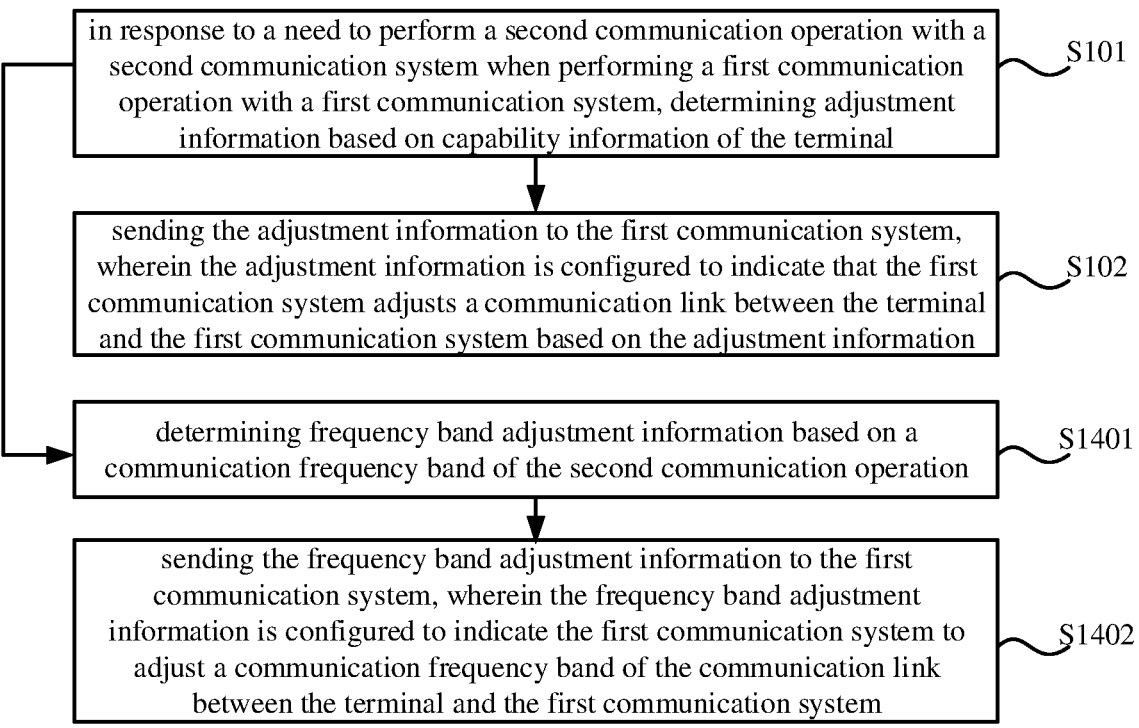
FIG. 14 is a schematic flowchart of yet another method for indicating adjustment according to an embodiment of the disclosure.

FIG. 14 is a schematic flowchart of yet another method for indicating adjustment according to an embodiment of the disclosure. As shown in FIG. 14, the method further includes the following steps.

At step S1401, frequency band adjustment information is determined based on a communication frequency band of the second communication operation.

At step S1402, the frequency band adjustment information is sent to the first communication system, in which the frequency band adjustment information is configured to indicate the first communication system to adjust a communication frequency band of the communication link between the terminal and the first communication system.

In an embodiment, the terminal can determine the frequency band adjustment information based on the communication frequency band of the second communication operation. The frequency band adjustment information may include a specific frequency band range, and the identifier of the frequency band. For example, when the frequency band identifier is A, after the first communication system receives the frequency band adjustment information, the first communication system may determine that the terminal needs to communicate with the second communication system in the frequency band A, and disconnect the communication link between the first communication system and the terminal in the A frequency band, so that the terminal can communicate with the second communication system in the frequency band A smoothly.

Figure 15:
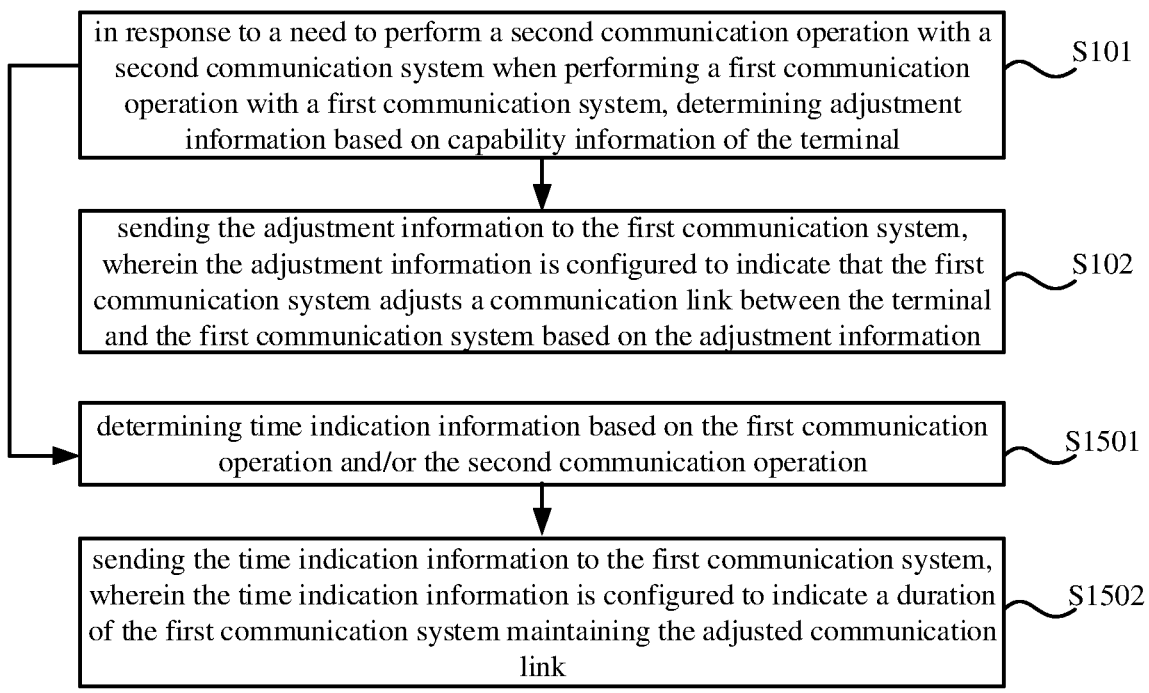
FIG. 15 is a schematic flowchart of yet another method for indicating adjustment according to an embodiment of the disclosure.

FIG. 15 is a schematic flowchart of yet another method for indicating adjustment according to an embodiment of the disclosure. As shown in FIG. 15, the method further includes the following steps.

At step S1501, time indication information is determined based on the first communication operation and/or the second communication operation.

At step S1502, the time indication information is sent to the first communication system, in which the time indication information is configured to indicate a duration of the first communication system maintaining the adjusted communication link.

In an embodiment, the terminal may determine the time indication information based on the first communication operation and/or the second communication operation. The time indication information may be a duration, and a period. For example, if the terminal predicts that the duration of the second communication operation is t0, the generated time indication information may indicate the duration t0. Upon receiving the time indication information, the first communication system may suspend the communication link between the terminal and the first communication system and may last for at least t0, to ensure that the terminal can communicate with the second communication system smoothly within the duration.

The terminal may also determine the time indication information based on the first communication operation and the second communication operation. For example, after determining the duration t0 described above, the terminal may also determine a first service corresponding to the first communication operation, and a second service corresponding to the second communication operation. If a priority of the first service is lower than that of the second service, the duration indicated by the time indication information may be longer than t0, so as to leave sufficient time for the terminal to communicate with the second communication system. If the priority of the first service is equal to that of the second service, the duration indicated by the time indication information may be equal to t0, so as to complete the communication with the second communication system as soon as possible and return to the first communication system to continue the communication of the higher priority service.

Figure 16:
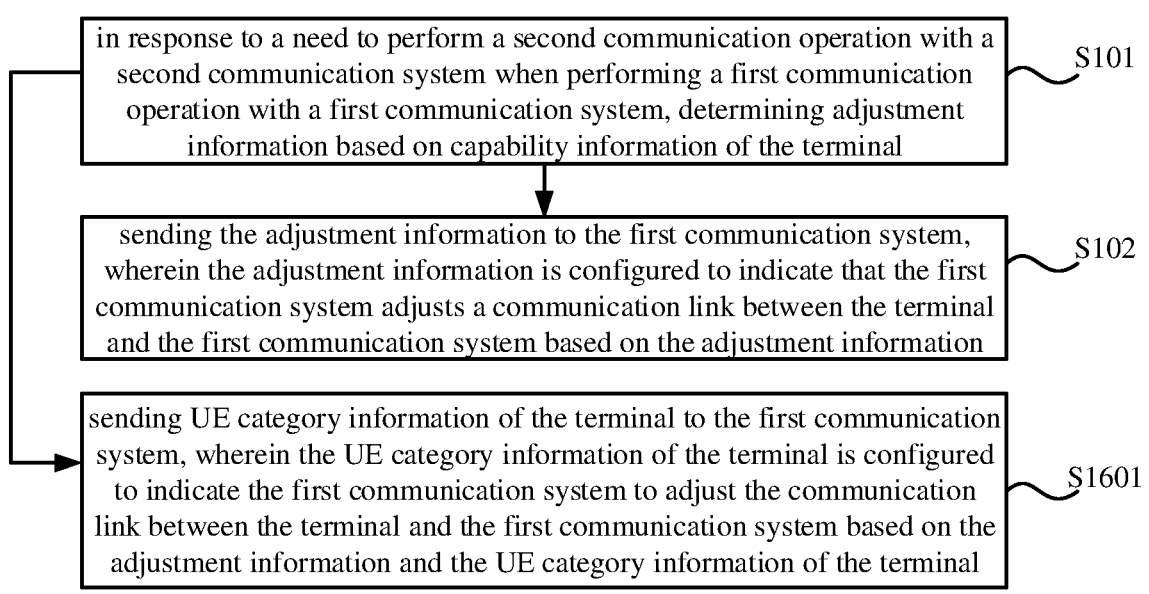
FIG. 16 is a schematic flowchart of yet another method for indicating adjustment according to an embodiment of the disclosure.

FIG. 16 is a schematic flowchart of yet another method for indicating adjustment according to an embodiment of the disclosure. As shown in FIG. 16, the method further includes the following steps.

At step S1601, UE category information of the terminal is sent to the first communication system, in which the UE category information of the terminal is configured to indicate the first communication system to adjust a communication link between the terminal and the first communication system based on the adjustment information and the UE category information of the terminal.

In an embodiment, the terminal may send its own UE category information (may also be called terminal capability level information) to the first communication system. Since the UE category information includes information such as the maximum number of layers of downlink spatial multiplexing supported by the terminal, so that the first communication system can accurately determine the communication capability of the terminal, facilitating accurate adjustment of the communication link between the terminal and the first communication system.

Figure 17:
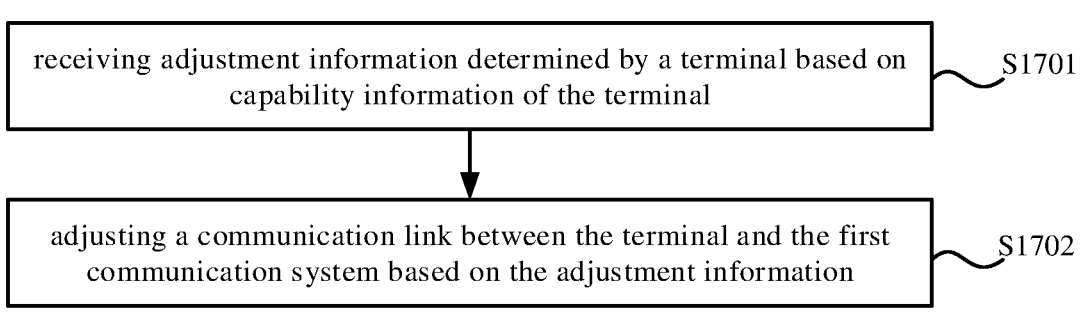
FIG. 17 is a schematic flowchart of a method for adjusting a communication link according to an embodiment of the disclosure.

FIG. 17 is a schematic flowchart of a method for adjusting a communication link according to an embodiment of the disclosure. The method shown in this embodiment may be applicable to a first communication system. The first communication system includes, but is not limited to, a 4G base station, a 5G base station, and a 6G base station. The first communication system may communicate with a terminal as a UE. The terminal includes, but is not limited to, a cell phone, a tablet computer, a wearable device, a sensor, an IoT device, and other electronic devices. In an embodiment, the terminal may be a terminal to which a method for indicating adjustment described in any of the above embodiments is applied.

As shown in FIG. 17, the method for adjusting a communication link includes the following steps.

At step S1701, adjustment information determined by a terminal based on capability information of the terminal is received.

At step S1702, a communication link between the terminal and the first communication system is adjusted based on the adjustment information.

This embodiment can receive the adjustment information determined by the terminal based on its own capability information, and then adjust the communication link between the terminal and the first communication system based on the adjustment information, such that the first communication system can maintain one or more communication links between the terminal and the first communication system based on the capability information of the terminal, instead of disconnecting all communication links between the terminal and the first communication system.

For example, if the capability information of the terminal is that a plurality of transmitting antennas are provided in the terminal, the adjustment information determined may be not to suspend the communication uplink between the terminal and the first communication system. After receiving the adjustment information, the first communication system may not suspend the communication uplink between the terminal and the first communication system, i.e., the first communication system continues to maintain the uplink communication between the terminal and the first communication system during the communication operation between the terminal and the second communication system, which is conducive to ensuring the communication efficiency between the terminal and the first communication system.

The first communication system may determine whether the downlink communication link between the terminal and the first communication system is suspended based on other information, for example, based on whether the second communication operation with the second communication system performed by the terminal includes a downlink communication operation, and the number of receiving antennas for downlink communication set in the terminal.

It should be noted that although the adjustment information sent by the terminal to the first communication system can indicate how the first communication system adjusts the communication link, the first communication system can adjust the communication link with reference to the adjustment information, but does not adjust the communication link entirely based on the adjustment information. How to adjust the communication link is mainly up to the first communication system itself.

Figure 18:
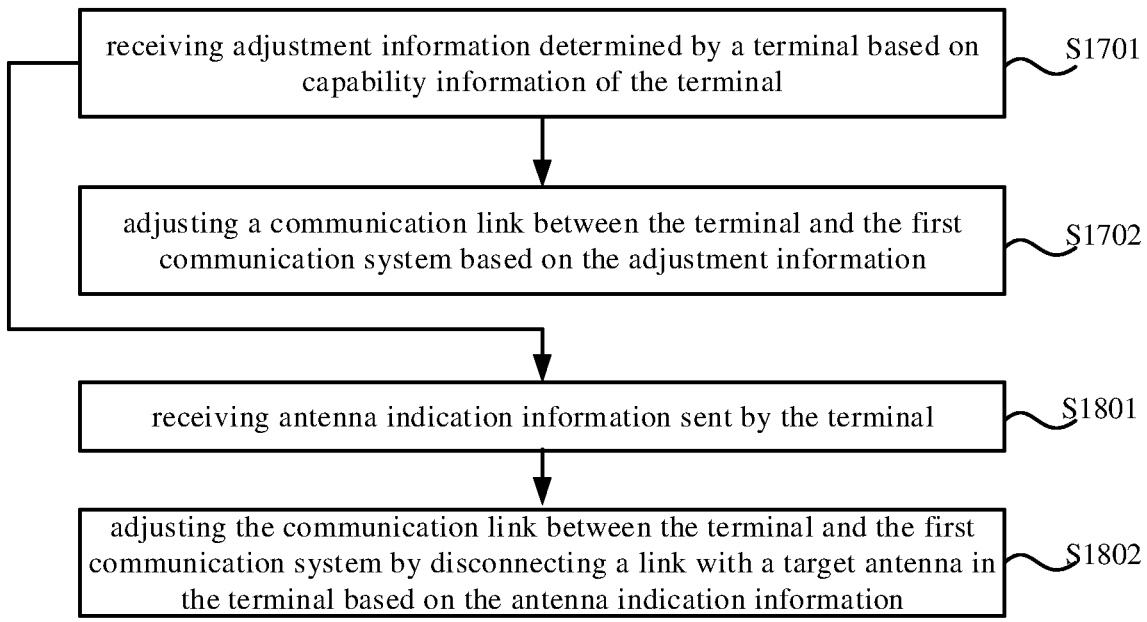
FIG. 18 is a schematic flowchart of another method for adjusting a communication link according to an embodiment of the disclosure.

FIG. 18 is a schematic flowchart of yet another method for adjusting a communication link according to an embodiment of the disclosure. As shown in FIG. 18, the method further includes the following steps.

At step S1801, antenna indication information sent by the terminal is received.

At step S1802, a communication link between the terminal and the first communication system is adjusted by disconnecting a link with a target antenna in the terminal based on the antenna indication information.

In an embodiment, the terminal may receive the antenna indication information determined based on the first number of transmitting antennas and the second number of receiving antennas. The antenna indication information may include the identifiers of the antennas. For example, if the first number is greater than 1 and the second number is equal to 1, the antenna indication information may include the identifier of the target transmitting antenna that is communicating with the first communication system in the transmitting antennas. After receiving the antenna indication information, the first communication system may determine that the target transmitting antenna is the transmitting antenna being used currently based on the identifier of the target transmitting antenna, and may suspend the communication uplink with the target transmitting antenna, so that the terminal may use the target transmitting antenna for uplink communication with the second communication system.

Figure 19:
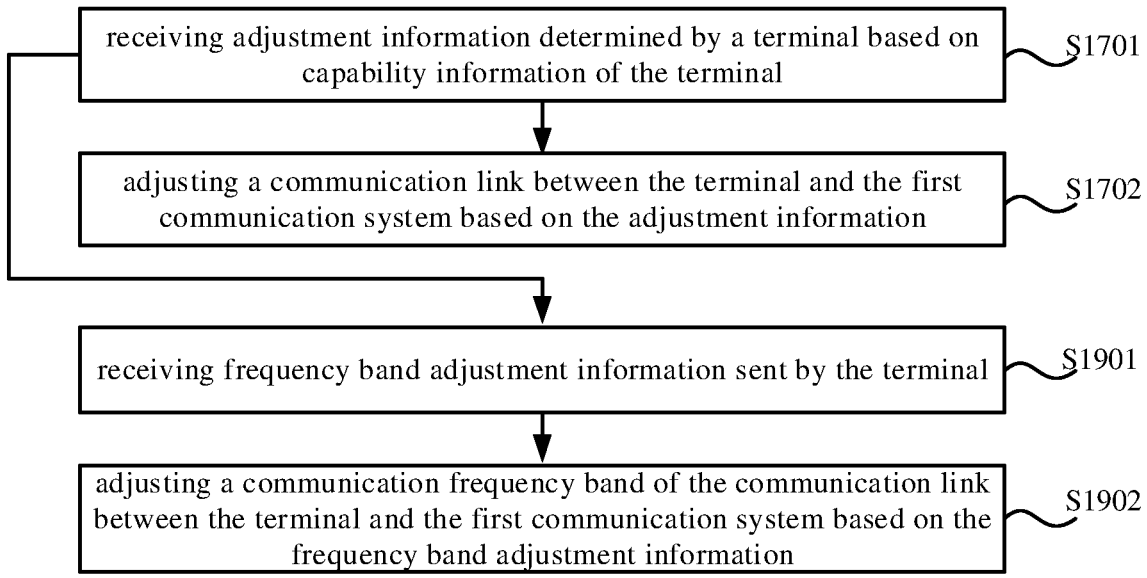
FIG. 19 is a schematic flowchart of yet another method for adjusting a communication link according to an embodiment of the disclosure.

FIG. 19 is a schematic flowchart of yet another method for adjusting a communication link according to an embodiment of the disclosure. As shown in FIG. 19, the method further includes the following steps.

At step S1901, frequency band adjustment information sent by the terminal is received.

At step S1902, a communication frequency band of the communication link between the terminal and the first communication system is adjusted based on the frequency band adjustment information.

In an embodiment, the frequency band adjustment information determined by the terminal based on the communication frequency band of the second communication operation can be received, and the frequency band adjustment information may include a specific frequency band range, and the identifier of the frequency band. For example, when the frequency band identifier is A, after the first communication system receives the frequency band adjustment information, it is determined that the terminal needs to communicate with the second communication system in the frequency band A, and the communication link between the first communication system and the terminal in the frequency band A can be disconnected, so that the terminal can communicate with the second communication system in the frequency band A smoothly.

Figure 20:
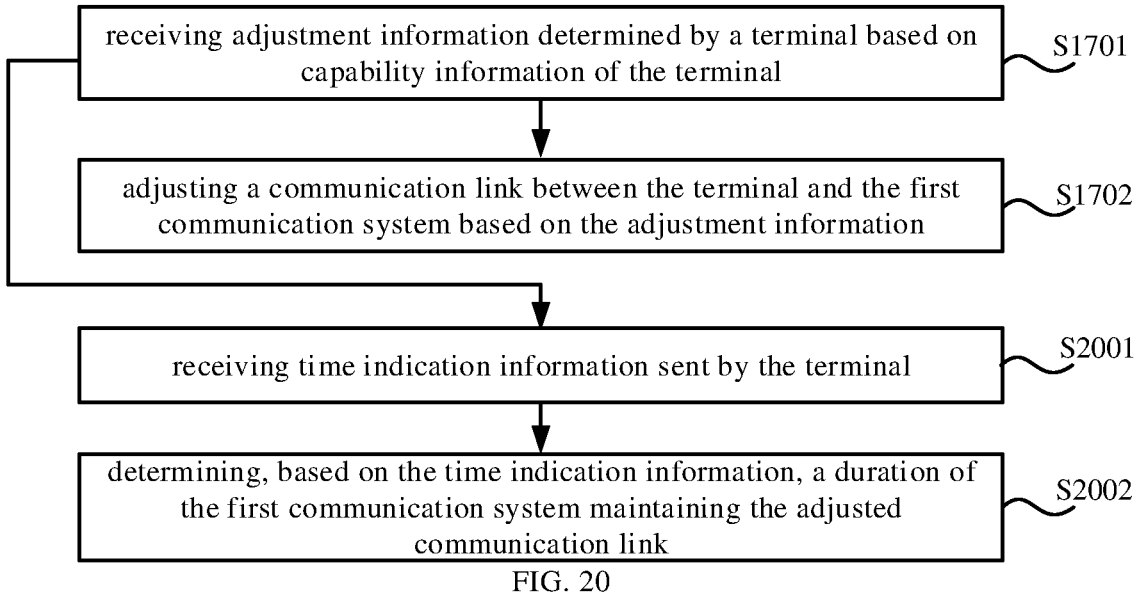
FIG. 20 is a schematic flowchart of yet another method for adjusting a communication link according to an embodiment of the disclosure.

FIG. 20 is a schematic flowchart of yet another method for adjusting a communication link according to an embodiment of the disclosure. As shown in FIG. 20, the method further includes the following steps.

At step S2001, time indication information sent by the terminal is received.

At step S2002, based on the time indication information, a duration of the first communication system maintaining the adjusted communication link is determined.

In an embodiment, the time indication information determined by the terminal based on the first communication operation and/or the second communication operation may be received, and the time indication information may be a duration, and a period. For example, if the terminal predicts that the duration of the second communication operation is t0, the generated time indication information may indicate the duration t0. Upon receiving the time indication information, the first communication system may suspend the communication link between the terminal and the first communication system and may last for at least t0, to ensure that the terminal can communicate with the second communication system smoothly for that duration.

Figure 21:
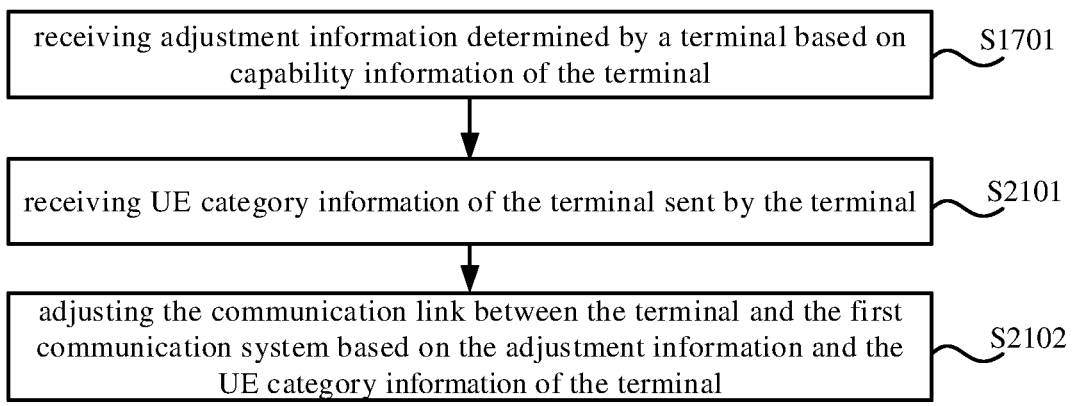
FIG. 21 is a schematic flowchart of yet another method for adjusting a communication link according to an embodiment of the disclosure.

FIG. 21 is a schematic flowchart of yet another method for adjusting a communication link according to an embodiment of the disclosure. As shown in FIG. 21, the method further includes the following steps.

At step S2101, UE category information of the terminal sent by the terminal is received.

Adjusting the communication link between the terminal and the first communication system based on the adjustment information includes step S2102.

At step S2102, the communication link between the terminal and the first communication system is adjusted based on the adjustment information and the UE category information of the terminal.

In an embodiment, the UE category information sent by the terminal can be received. Since the UE category information includes information such as the maximum number of layers of downlink spatial multiplexing supported by the terminal, the first communication system can accurately determine the communication capability of the terminal, facilitating the accurate adjustment of the communication link between the terminal and the first communication system.

Optionally, the first communication system and the second communication system includes at least one of: different base stations in different operator networks, different or identical base stations in the same operator network, or base stations in a licensed frequency band and access points in an unlicensed frequency band.

The disclosure also provides the embodiments of the apparatus for indicating adjustment and the apparatus for adjusting a communication link corresponding to the method for indicating adjustment and the method for adjusting a communication link described in the aforementioned embodiments.

Figure 22:
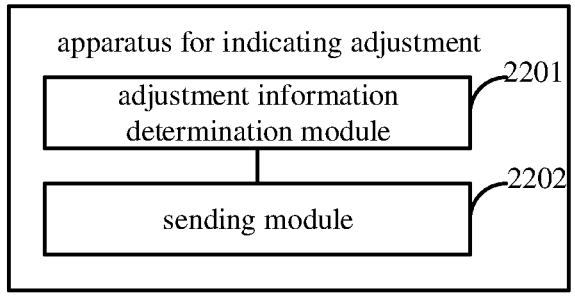
FIG. 22 is a schematic block diagram of an apparatus for indicating adjustment according to an embodiment of the disclosure.

FIG. 22 is a schematic block diagram of an apparatus for indicating adjustment according to an embodiment of the disclosure. The apparatus shown in this embodiment may be applicable to a terminal, which includes, but is not limited to, a cell phone, a tablet computer, a wearable device, a sensor, an IoT device, and other electronic devices. The terminal may communicate with a first communication system. The first communication system includes, but is not limited to, a 4G base station, a 5G base station, and a 6G base station. In an embodiment, the first communication system may be a first communication system to which a method for adjusting a communication link described in any of the subsequent embodiments is applied.

As shown in FIG. 22, the apparatus includes: an adjustment information determination module 2201 and a sending module 2202. The adjustment information determination module 2201 is configured to, in response to a need to perform a second communication operation with a second communication system when performing a first communication operation with a first communication system, determine adjustment information based on capability information of the terminal. The sending module 2202 is configured to send the adjustment information to the first communication system, in which the adjustment information is configured to indicate that the first communication system adjusts a communication link between the terminal and the first communication system based on the adjustment information.

Optionally, the capability information of the terminal includes hardware capability information and/or software capability information.

Optionally, the hardware capability information includes at least one of: a first number of transmitting antennas in the terminal, or a second number of receiving antennas in the terminal.

Optionally, the hardware capability information of the terminal includes the first number and the second number, the adjustment information determination module 2201 is configured to, in response to the first number being greater than 1 and the second number being equal to 1, and in response to the second communication operation including a downlink communication operation and not including an uplink communication operation, determine first adjustment information. The first adjustment information is configured to indicate the first communication system to suspend a communication downlink between the terminal and the first communication system, and/or not to suspend a communication uplink between the terminal and the first communication system.

Optionally, the hardware capability information of the terminal includes the first number and the second number, and the adjustment information determination module 2201 is configured to, in response to the first number being greater than 1 and the second number being equal to 1, and in response to the second communication operation including an uplink communication operation and not including a downlink communication operation, second adjustment information is determined. The second adjustment information is configured to indicate the first communication system not to suspend a communication downlink between the terminal and the first communication system.

Optionally, the second adjustment information is further configured to indicate the first communication system not to suspend a communication uplink between the terminal and the first communication system, or to indicate the first communication system to suspend the communication uplink between the terminal and the first communication system.

Figure 23:
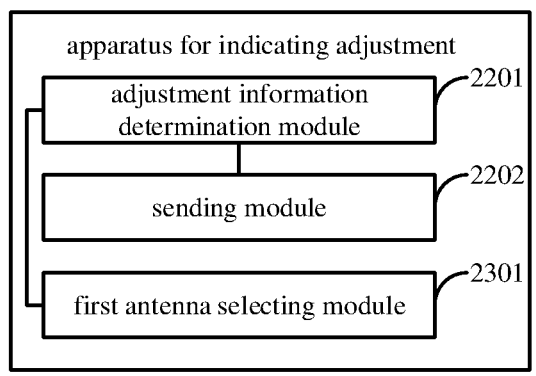
FIG. 23 is a schematic block diagram of another apparatus for indicating adjustment according to an embodiment of the disclosure.

FIG. 23 is a schematic block diagram of another apparatus for indicating adjustment according to an embodiment of the disclosure. As shown in FIG. 23, the second adjustment information is further configured to indicate the first communication system not to suspend the communication uplink between the terminal and the first communication system, and the apparatus further includes: a first antenna selecting module 2301. The first antenna selecting module 2301 is configured to perform the first communication operation by a first transmitting antenna, and perform the second communication operation by a second transmitting antenna.

Optionally, the hardware capability information of the terminal includes the first number and the second number. The adjustment information determination module 2201 is configured to, in response to the first number being greater than 1 and the second number being equal to 1, and in response to the second communication operation including an uplink communication operation and a downlink communication operation, determine third adjustment information. The third adjustment information is configured to indicate the first communication system to suspend a communication downlink between the terminal and the first communication system.

Optionally, the third adjustment information is further configured to indicate the first communication system not to suspend a communication uplink between the terminal and the first communication system, or to indicate the first communication system to suspend the communication uplink between the terminal and the first communication system.

Figure 24:
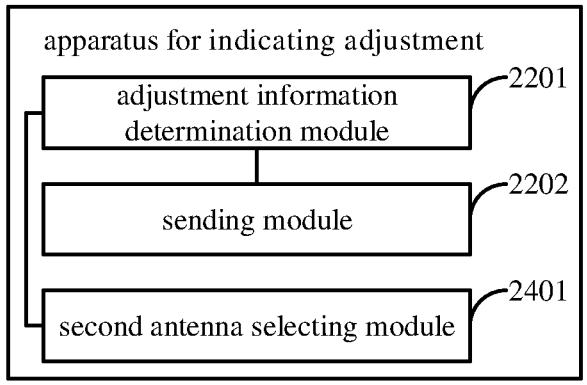
FIG. 24 is a schematic block diagram of yet another apparatus for indicating adjustment according to an embodiment of the disclosure.

FIG. 24 is a schematic block diagram of yet another apparatus for indicating adjustment according to an embodiment of the disclosure. As shown in FIG. 24, the third adjustment information is further configured to indicate the first communication system not to suspend a communication uplink between the terminal and the first communication system, and the apparatus further includes: a second antenna selecting module 2401. The second antenna selecting module 2401 is configured to perform the first communication operation by a first transmitting antenna, and perform the second communication operation by a second transmitting antenna and a second receiving antenna.

Optionally, the hardware capability information of the terminal includes the first number and the second number. The adjustment information determination module 2201 is configured to, in response to the first number being greater than 1 and the second number being equal to 1, and in response to the second communication operation including an uplink communication operation and not including a downlink communication operation, determine fourth adjustment information. The fourth adjustment information is configured to indicate the first communication system to suspend a communication uplink between the terminal and the first communication system, and/or not to suspend a communication downlink between the terminal and the first communication system.

Optionally, the hardware capability information of the terminal includes the first number and the second number. The adjustment information determination module 2201 is configured to, in response to the first number being equal to 1 and the second number being greater than 1, and in response to the second communication operation including a downlink communication operation and not including an uplink communication operation, determine fifth adjustment information. The fifth adjustment information is configured to indicate the first communication system not to suspend a communication uplink between the terminal and the first communication system.

Optionally, the fifth adjustment information is further configured to indicate the first communication system not to suspend a communication downlink between the terminal and the first communication system, or to indicate the first communication system to suspend the communication downlink between the terminal and the first communication system.

Figure 25:
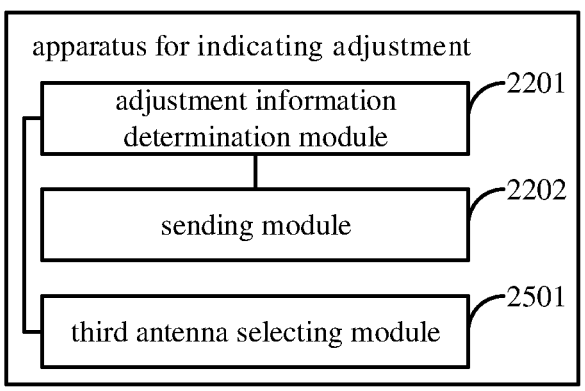
FIG. 25 is a schematic block diagram of yet another apparatus for indicating adjustment according to an embodiment of the disclosure.

FIG. 25 is a schematic block diagram of yet another apparatus for indicating adjustment according to an embodiment of the disclosure. As shown in FIG. 25, the fifth adjustment information is further configured to indicate the first communication system not to suspend a communication downlink between the terminal and the first communication system, and the apparatus further includes: a third antenna selecting module 2501. The third antenna selecting module 2501 is configured to perform the first communication operation by a first receiving antenna, and perform the second communication operation by a second receiving antenna.

Optionally, the hardware capability information of the terminal includes the first number and the second number, the adjustment information determination module 2201 is configured to, in response to the first number being equal to 1 and the second number being greater than 1, and in response to the second communication operation includes a downlink communication operation and an uplink communication operation, determine sixth adjustment information. The sixth adjustment information is configured to indicate the first communication system to suspend a communication uplink between the terminal and the first communication system.

Optionally, the sixth adjustment information is further configured to indicate the first communication system not to suspend a communication downlink between the terminal and the first communication system, or to indicate the first communication system to suspend the communication downlink between the terminal and the first communication system.

Figure 26:
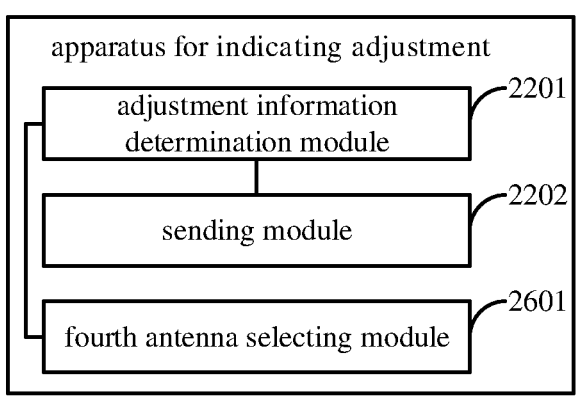
FIG. 26 is a schematic block diagram of yet another apparatus for indicating adjustment according to an embodiment of the disclosure.

FIG. 26 is a schematic block diagram of an apparatus for indicating adjustment according to an embodiment of the disclosure. As shown in FIG. 26, the sixth adjustment information is further configured to indicate the first communication system not to suspend a communication downlink between the terminal and the first communication system, and the apparatus further includes: a fourth antenna selecting module 2601. The fourth antenna selecting module 2601 is configured to perform the first communication operation by a first receiving antenna, and perform the second communication operation by a second transmitting antenna and a second receiving antenna.

Figure 27:
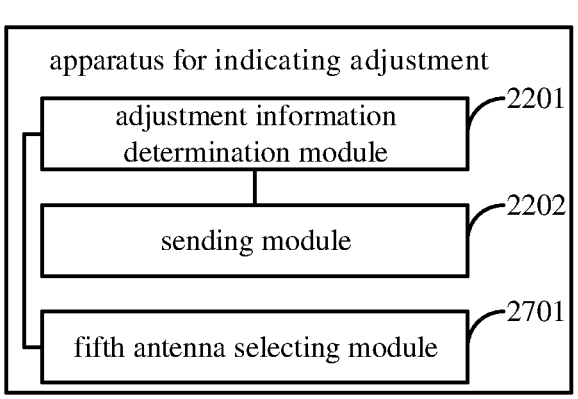
FIG. 27 is a schematic block diagram of yet another apparatus for indicating adjustment according to an embodiment of the disclosure.

FIG. 27 is a schematic block diagram of an apparatus for indicating adjustment according to an embodiment of the disclosure. As shown in FIG. 27, the apparatus further includes: a fifth antenna selecting module 2701. The fifth antenna selecting module 2701 is configured to, in response to the second communication operation including neither a downlink communication operation nor an uplink communication operation, perform the first communication operation by a transmitting antenna and/or a receiving antenna in the terminal.

Figure 28:
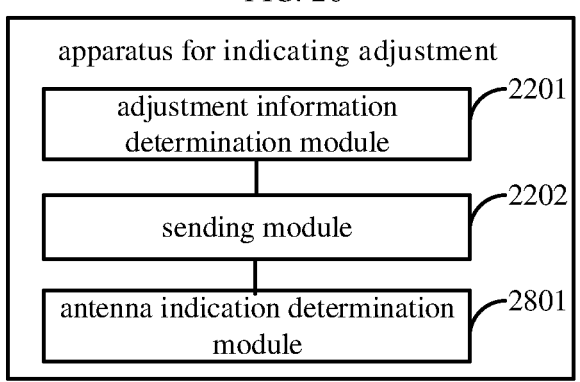
FIG. 28 is a schematic block diagram of yet another apparatus for indicating adjustment according to an embodiment of the disclosure.

FIG. 28 is a schematic block diagram of yet another apparatus for indicating adjustment according to an embodiment of the disclosure. As shown in FIG. 28, the hardware capability information of the terminal includes the first number and the second number, and the apparatus further includes: an antenna indication determination module 2801. The antenna indication determination module 2801 is configured to determine antenna indication information based on the first number and the second number. The sending module is configured to send the antenna indication information to the first communication system, in which the antenna indication information is configured to indicate the first communication system to adjust a communication link between the terminal and the first communication system by disconnecting a link with a target antenna in the terminal.

Figure 29:
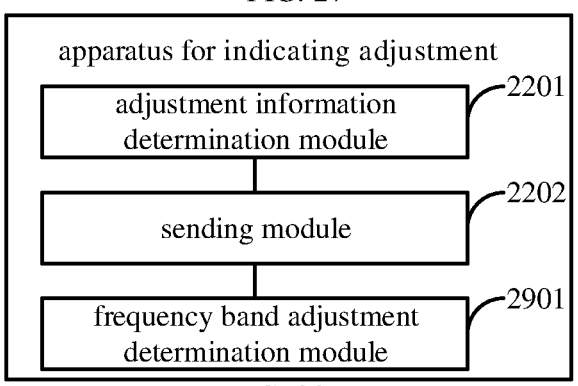
FIG. 29 is a schematic block diagram of yet another apparatus for indicating adjustment according to an embodiment of the disclosure.

FIG. 29 is a schematic block diagram of yet another apparatus for indicating adjustment according to an embodiment of the disclosure. As shown in FIG. 29, the apparatus further includes: a frequency band adjustment determination module 2901. The frequency band adjustment determination module 2901 is configured to determine frequency band adjustment information based on a communication frequency band of the second communication operation. The sending module is configured to send the frequency band adjustment information to the first communication system, in which the frequency band adjustment information is configured to indicate the first communication system to adjust a communication frequency band of the communication link between the terminal and the first communication system.

Figure 30:
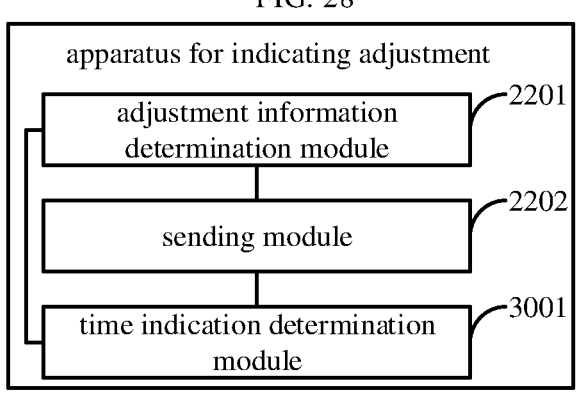
FIG. 30 is a schematic block diagram of yet another apparatus for indicating adjustment according to an embodiment of the disclosure.

FIG. 30 is a schematic block diagram of an apparatus for indicating adjustment according to an embodiment of the disclosure. As shown in FIG. 30, the apparatus further includes: a time indication determination module 3001. The time indication determination module 3001 is configured to determine time indication information based on the first communication operation and/or the second communication operation. The sending module is configured to send the time indication information to the first communication system, in which the time indication information is configured to indicate a duration of the first communication system maintaining the adjusted communication link.

Optionally, the sending module is further configured to send UE category information of the terminal to the first communication system, in which the UE category information of the terminal is configured to indicate the first communication system to adjust the communication link between the terminal and the first communication system based on the adjustment information and the UE category information of the terminal.

Optionally, the first communication system and the second communication system includes at least one of: different base stations in different operator networks, different or identical base stations in the same operator network, or base stations in a licensed frequency band and access points in an unlicensed frequency band.

Figure 31:
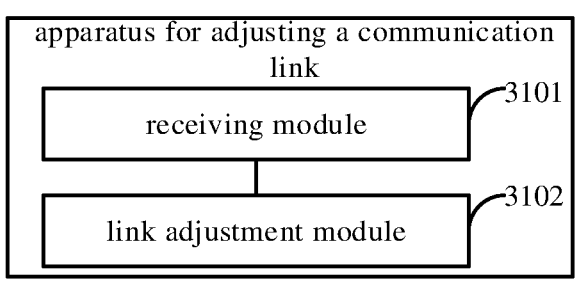
FIG. 31 is a schematic block diagram of an apparatus for adjusting a communication link according to an embodiment of the disclosure.

FIG. 31 is a schematic block diagram of an apparatus for adjusting a communication link according to an embodiment of the disclosure. The apparatus shown in this embodiment may be applicable to a first communication system. The first communication system includes, but is not limited to, a 4G base station, a 5G base station, and a 6G base station. The first communication system may communicate with a terminal as a UE. The terminal includes, but is not limited to, a cell phone, a tablet computer, a wearable device, a sensor, an IoT device, and other electronic devices. In an embodiment, the terminal may be a terminal to which a method for indicating adjustment described in any of the above embodiments is applied.

As shown in FIG. 31, the apparatus includes: a receiving module 3101 and a link adjustment module 3102. The receiving module 3101 is configured to receive adjustment information determined by a terminal based on capability information of the terminal. The link adjustment module 3102 is configured to adjust a communication link between the terminal and the first communication system based on the adjustment information.

Figure 32:
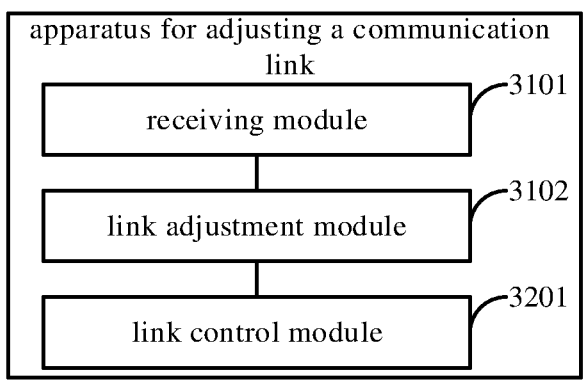
FIG. 32 is a schematic block diagram of another apparatus for adjusting a communication link according to an embodiment of the disclosure.

FIG. 32 is a schematic block diagram of an apparatus for adjusting a communication link according to an embodiment of the disclosure. As shown in FIG. 32, the receiving module is further configured to receive antenna indication information sent by the terminal.

The apparatus further includes: a link control module 3201. The link control module 3201 is configured to adjust a communication link between the terminal and the first communication system by disconnecting a link with a target antenna in the terminal based on the antenna indication information.

Figure 33:
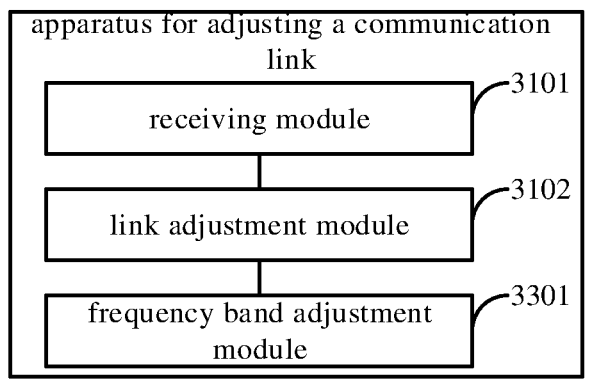
FIG. 33 is a schematic block diagram of another apparatus for adjusting a communication link according to an embodiment of the disclosure.

FIG. 33 is a schematic block diagram of another apparatus for adjusting a communication link according to an embodiment of the disclosure. As shown in FIG. 33, the receiving module is further configured to receive frequency band adjustment information sent by the terminal.

The apparatus further includes: a frequency band adjustment module 3301. The frequency band adjustment module 3301 is configured to adjust a communication frequency band of a communication link between the terminal and the first communication system based on the frequency band adjustment information.

Figure 34:
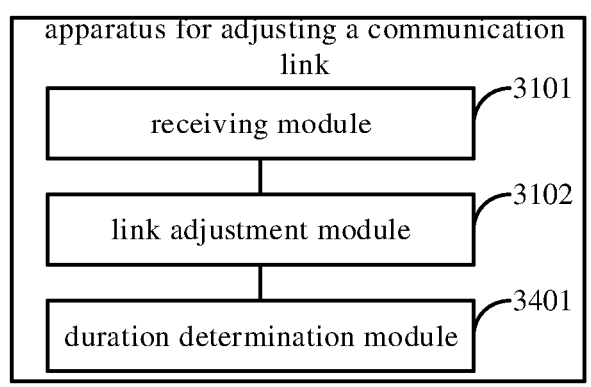
FIG. 34 is a schematic block diagram of another apparatus for adjusting a communication link according to an embodiment of the disclosure.

FIG. 34 is a schematic block diagram of yet another apparatus for adjusting a communication link according to an embodiment of the disclosure. As shown in FIG. 34, the receiving module is further configured to receive time indication information sent by the terminal.

The apparatus further includes: a duration determination module 3401. The duration determination module 3401 is configured to determine, based on the time indication information, a duration of the first communication system maintaining the adjusted communication link.

Optionally, the receiving module is further configured to receive UE category information of the terminal sent by the terminal. The link adjustment module is further configured to adjust the communication link between the terminal and the first communication system based on the adjustment information and the UE category information of the terminal.

Optionally, the first communication system and the second communication system includes at least one of: different base stations in different operator networks, different or identical base stations in the same operator network, or base stations in a licensed frequency band and access points in an unlicensed frequency band.

With respect to the apparatus in the above embodiment, the specific way in which each module performs its operation has been described in detail in the embodiment of the relevant method, which may not be described in detail here.

The apparatus embodiments basically correspond to the method embodiments, the related contents can refer to part of the descriptions of the method embodiments. The above-described apparatus embodiments are merely schematic, in which the modules described above as separate components may or may not be physically separated, and the components displayed as modules may or may not be physical modules, i.e., the components may be located in one area or may be distributed to multiple network modules. Some or all of these modules can be selected according to practical needs to achieve the purpose of the solution of the disclosure. Those skilled in the art can understand and implement the solution without inventive works.

An embodiment of the disclosure provides an electronic device. The electronic device includes: a processor; and a memory storing instructions executable by the processor; in which the processor is configured to implement the method for indicating adjustment of any one of the above embodiments, and/or the method for adjusting a communication link of any one of the above embodiments.

An embodiment of the disclosure provides a computer readable storage medium having computer programs stored. When the programs are executed by a processor, the method for indicating adjustment of any one of the above embodiments, and/or the method for adjusting a communication link of any one of the above embodiments is implemented.

Figure 35:
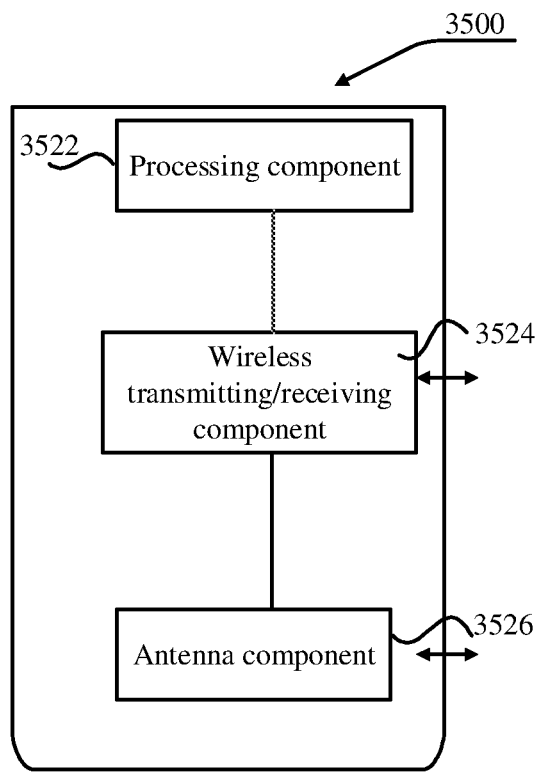
FIG. 35 is a schematic block diagram of a device for indicating adjustment according to an embodiment of the disclosure.

As shown in FIG. 35, FIG. 35 is a schematic block diagram of a device 3500 for indicating adjustment according to an embodiment of the disclosure. The device 3500 may be provided as a base station. As shown in FIG. 35, the device 3500 includes a processing component 3522, a wireless transmitting/receiving component 3524, an antenna component 3526, and a signal processing portion specific to a wireless interface. The processing component 3522 may include one or more processors. One of the processors in the processing component 3522 may be configured to implement the method for adjusting a communication link described in any of the above embodiments.

Figure 36:
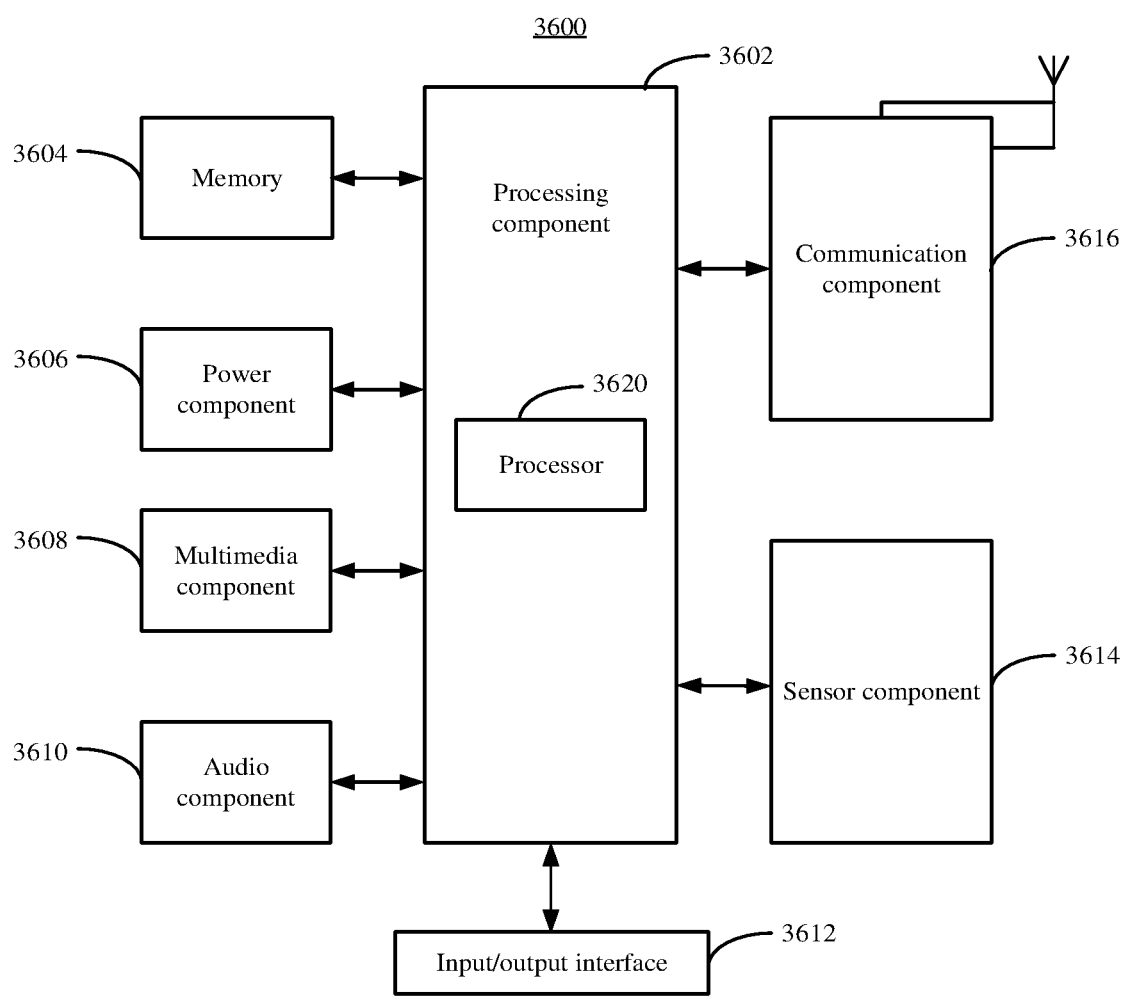
FIG. 36 is a schematic block diagram of a device for adjusting a communication link according to an embodiment of the disclosure.

FIG. 36 is a schematic block diagram of a device 3600 for adjusting a communication link according to an embodiment of the disclosure. For example, the device 3600 may be a cell phone, a computer, a digital broadcast terminal, a message sending and receiving device, a gaming console, a tablet device, a medical device, a fitness device, and a personal digital assistant.

As shown in FIG. 36, the device 3600 may include one or more of the following components: a processing component 3602, a memory 3604, a power component 3606, a multimedia component 3608, an audio component 3610, an input/output (I/O) interface 3612, a sensor component 3614, and a communication component 3616.

The processing component 3602 typically controls overall operations of the device 3600, such as the operations associated with display, telephone calls, data communications, camera operations, and recording operations. The processing component 3602 may include one or more processors 3620 to perform all or part of the steps in the method for indicating adjustment described above. Moreover, the processing component 3602 may include one or more modules which facilitate the interaction between the processing component 3602 and other components. For example, the processing component 3602 may include a multimedia module to facilitate the interaction between the multimedia component 3608 and the processing component 3602.

The memory 3604 is configured to store various types of data to support the operations of the device 3600. Examples of such data include instructions for any applications or methods operated on the device 3600, contact data, phonebook data, messages, pictures, video, etc. The memory 3604 may be implemented using any type of volatile or nonvolatile memory devices, or their combination, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a magnetic or optical disk.

The power component 3606 provides power to various components of the device 3600. The power component 3606 may include a power management system, one or more power sources, and any other components associated with the generation, management, and distribution of power in the device 3600.

The multimedia component 3608 includes a screen providing an output interface between the device 3600 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a duration and a pressure associated with the touch or swipe action. In some embodiments, the multimedia component 3608 includes a front-facing camera and/or a rear-facing camera. When the device 3600 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 3610 is configured to output and/or input audio signals. For example, the audio component 3610 includes a microphone (MIC) configured to receive an external audio signal when the device 3600 is in an operation mode, such as a call mode, a recording mode, and a voice recognition mode. The received audio signal may be further stored in the memory 3604 or transmitted via the communication component 3616. In some embodiments, the audio component 3610 further includes a speaker to output audio signals.

The I/O interface 3612 provides an interface between the processing component 3602 and peripheral interface modules, such as a keyboard, a click wheel, buttons, and the like. The buttons may include, but are not limited to, a home button, a volume button, a starting button, and a locking button.

The sensor component 3614 includes one or more sensors to provide status assessments of various aspects of the device 3600. For instance, the sensor component 3614 may detect an open/closed status of the device 3600, relative positioning of components, e.g., the display and the keypad, of the device 3600, a change in position of the device 3600 or a component of the device 3600, a presence or absence of user contact with the device 3600, an orientation or an acceleration/deceleration of the device 3600, and a change in temperature of the device 3600. The sensor component 3614 may include a proximity sensor configured to detect the presence of nearby objects without any physical contact. The sensor component 3614 may also include a light sensor, such as a complementary metal oxide semiconductor (CMOS) or charge-coupled device (CCD) image sensor, for use in imaging applications. In some embodiments, the sensor component 3614 may also include an accelerometer sensor, a gyroscope sensor, a magnetic sensor, a pressure sensor, or a temperature sensor.

The communication component 3616 is configured to facilitate communication, wired or wirelessly, between the device 3600 and other devices. The device 3600 can access a wireless network based on a communication standard, such as WiFi, 2G or 3G, 4G LTE, 5G NR or their combination. In an exemplary embodiment, the communication component 3616 receives a broadcast signal or broadcast associated information from an external broadcast management system via a broadcast channel. In an exemplary embodiment, the communication component 3616 further includes a near field communication (NFC) module to facilitate short-range communication. For example, the NFC module may be implemented based on a RF identification (RFID) technology, an infrared data association (IrDA) technology, an ultra-wide band (UWB) technology, a blue tooth (BT) technology, and other technologies.

In the exemplary embodiment, the device 3600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors or other electronic components, for performing the method for indicating adjustment described above.

In the exemplary embodiments, there is also provided a non-transitory computer readable storage medium including executable instructions, such as the memory 3604, executable by the processor 3620 in the device 3600, for performing the method for indicating adjustment described above. For example, the non-transitory computer-readable storage medium may be a ROM, a random access memory (RAM), a CD-ROM, a magnetic tape, a floppy disc, and an optical data storage device.

In an implementation, a method for adjusting a communication link, applied to a terminal, includes: in response to a need to perform a second communication operation with a second communication system when performing a first communication operation with a first communication system, determining adjustment information based on capability information of the terminal; and sending the adjustment information to the first communication system, in which the adjustment information is configured to indicate that the first communication system adjusts a communication link between the terminal and the first communication system based on the adjustment information.

In an implementation, the capability information of the terminal includes hardware capability information and/or software capability information.

In an implementation, the hardware capability information includes at least one of: a first number of transmitting antennas in the terminal, or a second number of receiving antennas in the terminal.

In an implementation, the hardware capability information of the terminal includes the first number and the second number, and determining the adjustment information based on the capability information of the terminal includes: in response to the first number being greater than 1 and the second number being equal to 1, and in response to the second communication operation including a downlink communication operation and not including an uplink communication operation, determining first adjustment information. The first adjustment information is configured to indicate the first communication system to suspend a communication downlink between the terminal and the first communication system, and/or not to suspend a communication uplink between the terminal and the first communication system.

In an implementation, the hardware capability information of the terminal comprises the first number and the second number, and determining the adjustment information based on the capability information of the terminal comprises: in response to the first number being greater than 1 and the second number being equal to 1, and in response to the second communication operation comprising an uplink communication operation and not comprising a downlink communication operation, determining second adjustment information. The second adjustment information is configured to indicate the first communication system not to suspend a communication downlink between the terminal and the first communication system.

In an implementation, the second adjustment information is further configured to indicate the first communication system not to suspend a communication uplink between the terminal and the first communication system, or to indicate the first communication system to suspend the communication uplink between the terminal and the first communication system.

In an implementation, the second adjustment information is further configured to indicate the first communication system not to suspend the communication uplink between the terminal and the first communication system, and the method further comprises: performing the first communication operation by a first transmitting antenna, and performing the second communication operation by a second transmitting antenna.

In an implementation, the hardware capability information of the terminal comprises the first number and the second number, and determining the adjustment information based on the capability information of the terminal comprises: in response to the first number being greater than 1 and the second number being equal to 1, and in response to the second communication operation comprising an uplink communication operation and a downlink communication operation, determining third adjustment information. The third adjustment information is configured to indicate the first communication system to suspend a communication downlink between the terminal and the first communication system.

In an implementation, the third adjustment information is further configured to indicate the first communication system not to suspend a communication uplink between the terminal and the first communication system, or to indicate the first communication system to suspend the communication uplink between the terminal and the first communication system.

In an implementation, the third adjustment information is further configured to indicate the first communication system not to suspend the communication uplink between the terminal and the first communication system, and the method further comprises: performing the first communication operation by a first transmitting antenna, and performing the second communication operation by a second transmitting antenna and a second receiving antenna.

In an implementation, the hardware capability information of the terminal comprises the first number and the second number, and determining the adjustment information based on the capability information of the terminal comprises: in response to the first number being greater than 1 and the second number being equal to 1, and in response to the second communication operation comprising an uplink communication operation and not comprising a downlink communication operation, determining fourth adjustment information. The fourth adjustment information is configured to indicate the first communication system to suspend a communication uplink between the terminal and the first communication system, and/or not to suspend a communication downlink between the terminal and the first communication system.

In an implementation, the hardware capability information of the terminal comprises the first number and the second number, and determining the adjustment information based on the capability information of the terminal comprises: in response to the first number being equal to 1 and the second number being greater than 1, and in response to the second communication operation comprising a downlink communication operation and not comprising an uplink communication operation, determining fifth adjustment information. The fifth adjustment information is configured to indicate the first communication system not to suspend a communication uplink between the terminal and the first communication system.

In an implementation, the fifth adjustment information is further configured to indicate the first communication system not to suspend a communication downlink between the terminal and the first communication system, or to indicate the first communication system to suspend the communication downlink between the terminal and the first communication system.

In an implementation, the fifth adjustment information is further configured to indicate the first communication system not to suspend the communication downlink between the terminal and the first communication system, and the method further comprises: performing the first communication operation by a first receiving antenna, and performing the second communication operation by a second receiving antenna.

In an implementation, the hardware capability information of the terminal comprises the first number and the second number, and determining the adjustment information based on the capability information of the terminal comprises: in response to the first number being equal to 1 and the second number being greater than 1, and in response to the second communication operation comprising a downlink communication operation and an uplink communication operation, determining sixth adjustment information. The sixth adjustment information is configured to indicate the first communication system to suspend a communication uplink between the terminal and the first communication system.

In an implementation, the sixth adjustment information is further configured to indicate the first communication system not to suspend a communication downlink between the terminal and the first communication system, or to indicate the first communication system to suspend the communication downlink between the terminal and the first communication system.

In an implementation, the sixth adjustment information is further configured to indicate the first communication system not to suspend the communication downlink between the terminal and the first communication system, and the method further comprises: performing the first communication operation by a first receiving antenna, and performing the second communication operation by a second transmitting antenna and a second receiving antenna.

In an implementation, the method further includes: in response to the second communication operation comprising neither a downlink communication operation nor an uplink communication operation, performing the first communication operation by a transmitting antenna and/or a receiving antenna in the terminal.

In an implementation, the hardware capability information of the terminal comprises the first number and the second number, and the method further comprises: determining antenna indication information based on the first number and the second number; and sending the antenna indication information to the first communication system, wherein the antenna indication information is configured to indicate the first communication system to adjust the communication link between the terminal and the first communication system by disconnecting a link with a target antenna in the terminal.

In an implementation, the method further includes: determining frequency band adjustment information based on a communication frequency band of the second communication operation; and sending the frequency band adjustment information to the first communication system, wherein the frequency band adjustment information is configured to indicate the first communication system to adjust a communication frequency band of the communication link between the terminal and the first communication system.

In an implementation, the method further includes: determining time indication information based on the first communication operation and/or the second communication operation; and sending the time indication information to the first communication system, wherein the time indication information is configured to indicate a duration of the first communication system maintaining the adjusted communication link.

In an implementation, the method further includes: sending user equipment (UE) category information of the terminal to the first communication system, wherein the UE category information of the terminal is configured to indicate the first communication system to adjust the communication link between the terminal and the first communication system based on the adjustment information and the UE category information of the terminal.

In an implementation, the first communication system and the second communication system comprises at least one of: different base stations in different operator networks, different or identical base stations in a same operator network, or base stations in a licensed frequency band and access points in an unlicensed frequency band.

In an implementation, a method for adjusting a communication link, applied to a first communication system, includes: receiving adjustment information determined by a terminal based on capability information of the terminal; and adjusting a communication link between the terminal and the first communication system based on the adjustment information.

In an implementation, the method further includes: receiving antenna indication information sent by the terminal; and adjusting the communication link between the terminal and the first communication system by disconnecting a link with a target antenna in the terminal based on the antenna indication information.

In an implementation, the method further includes: receiving frequency band adjustment information sent by the terminal; and adjusting a communication frequency band of the communication link between the terminal and the first communication system based on the frequency band adjustment information.

In an implementation, the method further includes: receiving time indication information sent by the terminal; and determining, based on the time indication information, a duration of the first communication system maintaining the adjusted communication link.

In an implementation, the method further includes: receiving user equipment (UE) category information of the terminal sent by the terminal. Adjusting the communication link between the terminal and the first communication system based on the adjustment information includes: adjusting the communication link between the terminal and the first communication system based on the adjustment information and the UE category information of the terminal.

In an implementation, the first communication system and the second communication system comprises at least one of: different base stations in different operator networks, different or identical base stations in the same operator network, or base stations in a licensed frequency band and access points in an unlicensed frequency band.

In an implementation, an apparatus for indicating adjustment, applied to a terminal, includes: an adjustment information determination module, configured to, in response to a need to perform a second communication operation with a second communication system when performing a first communication operation with a first communication system, determine adjustment information based on capability information of the terminal; and a sending module, configured to send the adjustment information to the first communication system, wherein the adjustment information is configured to indicate that the first communication system adjusts a communication link between the terminal and the first communication system based on the adjustment information.

In an implementation, an apparatus for adjusting a communication link, applied to a first communication system, includes: a receiving module, configured to receive adjustment information determined by a terminal based on capability information of the terminal; and a link adjusting module, configured to adjust a communication link between the terminal and the first communication system based on the adjustment information.

In an implementation, an electronic device includes a processor and a memory for storing instructions executable by the processor. The processor is configured to implement the above method for indicating adjustment, and/or the method for adjusting a communication link.

In an implementation, a computer readable storage medium has computer programs stored. When the programs are executed by a processor, the above method for indicating adjustment, and/or the method for adjusting a communication link is implemented.

Other embodiments of the disclosure will be apparent to those skilled in the art from consideration of the specification and practice of the disclosure disclosed here. This disclosure is intended to cover any variations, uses, or adaptations of the disclosure following the general principles of the disclosure and including such departures from the disclosure as come within known or conventional techniques in the art. It is intended that the specification and examples be considered as exemplary only, with a true scope of the disclosure being indicated by the following claims.

It will be appreciated that the disclosure is not limited to the exact construction that has been described above and illustrated in the accompanying drawings, and that various modifications and changes can be made without departing from the scope. It is intended that the scope of the disclosure only be limited by the appended claims.

It should be noted that the relational terms herein, such as "first" and "second", are used only for differentiating one entity or operation, from another entity or operation, which, however do not necessarily require or imply that there should be any real relationship or sequence. Moreover, the terms "comprise", "include" or any other variations thereof are meant to cover non-exclusive including, so that the process, method, article or device comprising a series of elements do not only comprise those elements, but also comprise other elements that are not explicitly listed or also comprise the inherent elements of the process, method, article or device. In the case that there are no more restrictions, an element qualified by the statement "comprises a . . . " does not exclude the presence of additional identical elements in the process, method, article or device that comprises the said element.

The method and apparatus embodiments of the disclosure have been described in detail above, and specific examples are applied in the disclosure to illustrate the principles and implementation of the disclosure. The above embodiments are only used to facilitate understanding the method and core ideas of the disclosure. Meanwhile, for those skilled in the art, according to the ideas of this disclosure, there will be changes in the specific implementation and application scope. In conclusion, the contents of the disclosure should not be understood as limiting the disclosure.

What is claimed is:

1. A method for indicating adjustment, performed by a terminal, comprising:
   in response to a need to perform a second communication operation with a second communication system when performing a first communication operation with a first communication system, determining adjustment information based on capability information of the terminal;
   sending the adjustment information to the first communication system, wherein the adjustment information is configured to indicate that the first communication system adjusts a communication link between the terminal and the first communication system based on the adjustment information; and
   in response to the second communication operation comprising neither a downlink communication operation nor an uplink communication operation, performing the first communication operation by at least one of a transmitting antenna or a receiving antenna in the terminal.

2. The method of claim 1, wherein the capability information of the terminal comprises at least one of hardware capability information or software capability information.

3. The method of claim 2, wherein the hardware capability information comprises at least one of:
   a first number of transmitting antennas in the terminal, or
   a second number of receiving antennas in the terminal.

4. The method of claim 3, wherein the hardware capability information of the terminal comprises the first number and the second number, and determining the adjustment information based on the capability information of the terminal comprises one of:
   in response to the first number being greater than 1 and the second number being equal to 1, and in response to the second communication operation comprising a downlink communication operation and not comprising an uplink communication operation, determining first adjustment information, wherein the first adjustment information is configured to perform at least one of indicating the first communication system to suspend a communication downlink between the terminal and the first communication system, or indicating the first communication system not to suspend a communication uplink between the terminal and the first communication system;
   in response to the first number being greater than 1 and the second number being equal to 1, and in response to the second communication operation comprising an uplink communication operation and not comprising a downlink communication operation, determining second adjustment information, wherein the second adjustment information is configured to indicate the first communication system not to suspend a communication downlink between the terminal and the first communication system;
   in response to the first number being greater than 1 and the second number being equal to 1, and in response to the second communication operation comprising an uplink communication operation and a downlink communication operation, determining third adjustment information, wherein the third adjustment information is configured to indicate the first communication system to suspend a communication downlink between the terminal and the first communication system;
   in response to the first number being greater than 1 and the second number being equal to 1, and in response to the second communication operation comprising an uplink communication operation and not comprising a downlink communication operation, determining fourth adjustment information, wherein the fourth adjustment information is configured to perform at least one of: indicating the first communication system to suspend a communication uplink between the terminal and the first communication system, or indicating the first communication system not to suspend a communication downlink between the terminal and the first communication system;
   in response to the first number being equal to 1 and the second number being greater than 1, and in response to the second communication operation comprising a downlink communication operation and not comprising an uplink communication operation, determining fifth adjustment information, wherein the fifth adjustment information is configured to indicate the first communication system not to suspend a communication uplink between the terminal and the first communication system; or
   in response to the first number being equal to 1 and the second number being greater than 1, and in response to the second communication operation comprising a downlink communication operation and an uplink communication operation, determining sixth adjustment information, wherein the sixth adjustment information is configured to indicate the first communication system to suspend a communication uplink between the terminal and the first communication system.

5. The method of claim 4, wherein the second adjustment information is further configured to perform at least one of indicating the first communication system not to suspend a communication uplink between the terminal and the first communication system, or indicating the first communication system to suspend the communication uplink between the terminal and the first communication system.

6. The method of claim 5, wherein the second adjustment information is further configured to indicate the first communication system not to suspend the communication uplink between the terminal and the first communication system, and the method further comprises:
   performing the first communication operation by a first transmitting antenna, and performing the second communication operation by a second transmitting antenna.

7. The method of claim 4, wherein the third adjustment information is further configured to perform at least one of indicating the first communication system not to suspend a communication uplink between the terminal and the first communication system, or indicating the first communication system to suspend the communication uplink between the terminal and the first communication system.

8. The method of claim 7, wherein the third adjustment information is further configured to indicate the first communication system not to suspend the communication uplink between the terminal and the first communication system, and the method further comprises:
performing the first communication operation by a first transmitting antenna, and performing the second communication operation by a second transmitting antenna and a second receiving antenna.

9. The method of claim 4, wherein the fifth adjustment information is further configured to perform at least one of indicating the first communication system not to suspend a communication downlink between the terminal and the first communication system, or indicating the first communication system to suspend the communication downlink between the terminal and the first communication system.

10. The method of claim 9, wherein the fifth adjustment information is further configured to indicate the first communication system not to suspend the communication downlink between the terminal and the first communication system, and the method further comprises:
performing the first communication operation by a first receiving antenna, and performing the second communication operation by a second receiving antenna.

11. The method of claim 4, wherein the sixth adjustment information is further configured to perform at least one of indicating the first communication system not to suspend a communication downlink between the terminal and the first communication system, or indicating the first communication system to suspend the communication downlink between the terminal and the first communication system.

12. The method of claim 11, wherein the sixth adjustment information is further configured to indicate the first communication system not to suspend the communication downlink between the terminal and the first communication system, and the method further comprises:
performing the first communication operation by a first receiving antenna, and performing the second communication operation by a second transmitting antenna and a second receiving antenna.

13. The method of claim 3, wherein the hardware capability information of the terminal comprises the first number and the second number, and the method further comprises:
determining antenna indication information based on the first number and the second number; and
sending the antenna indication information to the first communication system, wherein the antenna indication information is configured to indicate the first communication system to adjust the communication link between the terminal and the first communication system by disconnecting a link with a target antenna in the terminal.

14. The method of claim 1, further comprising at least one of:
determining frequency band adjustment information based on a communication frequency band of the second communication operation, and sending the frequency band adjustment information to the first communication system, wherein the frequency band adjustment information is configured to indicate the first communication system to adjust a communication frequency band of the communication link between the terminal and the first communication system;
determining time indication information based on at least one of the first communication operation or the second communication operation, and sending the time indication information to the first communication system, wherein the time indication information is configured to indicate a duration of the first communication system maintaining the adjusted communication link; or
sending user equipment (UE) category information of the terminal to the first communication system, wherein the UE category information of the terminal is configured to indicate the first communication system to adjust the communication link between the terminal and the first communication system based on the adjustment information and the UE category information of the terminal.

15. The method of claim 1, wherein the first communication system and the second communication system comprise at least one of:
different base stations in different operator networks, different or identical base stations in a same operator network, or base stations in a licensed frequency band and access points in an unlicensed frequency band.

16. A non-transitory computer readable storage medium having stored thereon programs that, when executed by a processor, cause the processor to perform the method of claim 1.

17. A method for adjusting a communication link, performed by a first communication system, comprising:
receiving adjustment information determined by a terminal based on capability information of the terminal; and
adjusting a communication link between the terminal and the first communication system based on the adjustment information;
wherein the adjustment information is determined in response to a need to perform a second communication operation with a second communication system when the terminal performs a first communication operation with the first communication system; and in response to the second communication operation comprising neither a downlink communication operation nor an uplink communication operation, the first communication operation is performed by at least one of a transmitting antenna or a receiving antenna in the terminal.

18. The method of claim 17, further comprising at least one of:
receiving antenna indication information sent by the terminal, and adjusting the communication link between the terminal and the first communication system by disconnecting a link with a target antenna in the terminal based on the antenna indication information;
receiving frequency band adjustment information sent by the terminal, and adjusting a communication frequency band of the communication link between the terminal and the first communication system based on the frequency band adjustment information;
receiving time indication information sent by the terminal, and determining, based on the time indication information, a duration of the first communication system maintaining the adjusted communication link; or receiving user equipment (UE) category information of the terminal sent by the terminal, and adjusting the communication link between the terminal and the first communication system based on the adjustment information and the UE category information of the terminal.

19. The method of claim 17, wherein the first communication system and the second communication system comprise at least one of:
different base stations in different operator networks, different or identical base stations in the same operator network, or base stations in a licensed frequency band and access points in an unlicensed licensed frequency band.

20. A terminal, comprising:
at least one of a transmitting antenna or a receiving antenna;
a processor; and
a memory for storing instructions executable by the processor;
wherein the processor is configured to:
in response to a need to perform a second communication operation with a second communication system when performing a first communication operation with a first communication system, determine adjustment information based on capability information of the terminal;
send the adjustment information to the first communication system, wherein the adjustment information is configured to indicate that the first communication system adjusts a communication link between the terminal and the first communication system based on the adjustment information; and
in response to the second communication operation comprising neither a downlink communication operation nor an uplink communication operation, the at least one of the transmitting antenna or the receiving antenna is configured to perform the first communication operation.

* * * * *